US012014707B2

(12) United States Patent
Williams et al.

(10) Patent No.: US 12,014,707 B2
(45) Date of Patent: Jun. 18, 2024

(54) SYSTEMS, DEVICES, AND METHODS FOR VARYING DIGITAL REPRESENTATIONS OF MUSIC

(71) Applicant: Obeebo Labs Ltd., Waterloo (CA)

(72) Inventors: Colin P. Williams, Half Moon Bay, CA (US); Gregory Gabrenya, Petaluma, CA (US)

(73) Assignee: Obeebo Labs Ltd., Waterloo (CA)

( * ) Notice: Subject to any disclaimer, the term of this patent is extended or adjusted under 35 U.S.C. 154(b) by 248 days.

(21) Appl. No.: 17/208,132

(22) Filed: Mar. 22, 2021

(65) Prior Publication Data

US 2021/0225340 A1 Jul. 22, 2021

Related U.S. Application Data

(60) Continuation of application No. 16/775,250, filed on Jan. 28, 2020, now Pat. No. 10,957,293, which is a division of application No. 16/448,130, filed on Jun. 21, 2019, now Pat. No. 10,629,176.

(51) Int. Cl.
*G10H 1/00* (2006.01)
*G10L 19/20* (2013.01)
*G10L 19/24* (2013.01)

(52) U.S. Cl.
CPC ......... *G10H 1/0025* (2013.01); *G10H 1/0041* (2013.01); *G10L 19/20* (2013.01); *G10L 19/24* (2013.01); *G10H 2220/101* (2013.01)

(58) Field of Classification Search
CPC ............... G10H 1/0025; G10H 1/0041; G10H 2220/101; G10L 19/20; G10L 19/24
See application file for complete search history.

(56) References Cited

U.S. PATENT DOCUMENTS

2003/0183065 A1* 10/2003 Leach ................. G10H 1/0025 84/609
2019/0005972 A1* 1/2019 Gogerly ................. G06F 21/16

* cited by examiner

*Primary Examiner* — Jianchun Qin
(74) *Attorney, Agent, or Firm* — Thomas Mahon

(57) ABSTRACT

Systems, devices, and methods for encoding digital representations of musical compositions are described. Various components of a musical composition that are defined in modern music theory, such as notes and bars, are encoded as respective hierarchically-dependent data objects in a data file. The hierarchically-dependent data objects encode the musical composition in a tree-like data structure with modular nodes and adjustable relationships between nodes. Note start times and beat start times are encoded independently of one another and characterized by a timing relationship that captures the expressiveness imbued when notes and beats are not precisely synchronized. Musical variations that preserve the timing relationship between the notes and beats of the original composition are also generated and encoded.

11 Claims, 12 Drawing Sheets

Music[{elem1, elem2, elem3}, {elem1→{bar11, bar12, bar13}, elem2→{bar21, bar22}, elem3→{bar31, bar32, bar33, bar34}}]

bar11[index, tSig, {tStart, tStop}, bpm, length, {chord1, ..., chordW}, track1, ..., trackX, key, {beat1, ..., beatY}, scale]

trackX[{note1, ..., noteZ}]

note1[pitch1, vol, tStart, tStop, instr]

SYSTEMS, DEVICES, AND METHODS FOR VARYING DIGITAL REPRESENTATIONS OF MUSIC

CROSS-REFERENCE TO RELATED APPLICATIONS

This application is a continuation of, and claims the benefit of, U.S. patent application Ser. No. 16/775,250, filed Jan. 28, 2020, titled "SYSTEMS, DEVICES, AND METHODS FOR VARYING MUSICAL COMPOSITIONS," which is a division of, and claims the benefit of, U.S. patent application Ser. No. 16,448,130, filed Jun. 21, 2019, titled "SYSTEMS, DEVICES, AND METHODS FOR DIGITAL REPRESENTATIONS OF MUSIC", the contents of both of which are incorporated herein in their entirety by reference.

BACKGROUND

Technical Field

The present systems, devices, and methods generally relate to computer-readable representations of music, and particularly relate to hierarchical digital file formats that enable improved computer-based algorithmic music composition.

Description of the Related Art

Musical Notation

Musical notation broadly refers to any application of inscribed symbols to visually represent the composition of a piece of music. The symbols provide a way of "writing down" a song so that, for example, it can be expressed and stored by a composer and later read and performed by a musician. While many different systems of musical notation have been developed throughout history, the most common form used today is sheet music.

Sheet music employs a particular set of symbols to represent a musical composition in terms of the concepts of modern musical theory. Concepts like: pitch, rhythm, tempo, chord, key, dynamics, meter, articulation, ornamentation, and many more, are all expressible in sheet music. Such concepts are so widely used in the art today that sheet music has become an almost universal language in which musicians communicate.

Digital Audio File Formats

While it is common for human musicians to communicate musical compositions in the form of sheet music, it is notably uncommon for computers to do so. Computers typically store and communicate music in well-established digital audio file formats, such as .midi, .wav, or .mp3 (just to name a few), that are designed to facilitate communication between electronic instruments and other devices by allowing for the efficient movement of musical waveforms over computer networks. In a digital audio file format, audio data is typically encoded in one of various audio coding formats (which may be compressed or uncompressed) and either provided as a raw bitstream or, more commonly, embedded in a container or wrapper format. When the audio data corresponds to a musical composition, the audio data usually corresponds to a particular instance (e.g., a particular performance or recording) of the musical composition with all of the nuance and expression specific to that particular instance. The audio data in well-established audio file formats typically does not capture most (or any) of the higher-level musical characteristics of the musical composition that would be represented in sheet music. On the other hand, sheet music typically does not capture the nuance or expression that can characterize a particular instance of a musical composition and make it stand out among other instances of the same composition, such as small imperfections in timing or rhythm.

Sheet music and well-established audio file formats are different from one another because they are designed to accomplish different things. Sheet music visually characterizes the composition of a piece of music using the high-level concepts of musical theory, while audio file formats encode digital data corresponding to a particular instance of the piece. As a result of these differences, sheet music and well-established audio file formats each have their respective advantages and disadvantages. Sheet music is particularly well-suited for use in the composition of music and poorly suited for use in the communication of audio data between computers, while audio file formats are well-suited for use in the communication of audio data between computers but poorly suited for use in the composition of music. Sheet music itself represents a definitive and unnaturally perfect instance of a piece of music while audio file formats may capture nuance and expression not present in the corresponding sheet music. There is a need in the art for a new way of representing music that combines the best features of these two forms, namely, a computer-readable digital audio file format that is well-suited for use in the communication of audio data between computers and that also encodes both the higher-level musical concepts and the nuance and expression that characterize a musical composition. Such a digital audio file format would have broad applicability in, among other things, computer-based composition of music.

BRIEF SUMMARY

A computer-implemented method of encoding a musical composition in a digital audio format may be summarized as including: encoding respective components of the musical composition in respective data objects; encoding the data objects in a data file; and storing the data file in a non-transitory processor-readable storage medium. Encoding respective components of the musical composition in respective data objects may include encoding respective components of the musical composition in a set of hierarchically-dependent data objects. Encoding respective components of the musical composition in a set of hierarchically-dependent data objects may include: encoding a first component of the musical composition in a first data object; encoding a second component of the musical composition in a second data object, the second data object including the first data object; and encoding a third component of the musical composition in a third data object, the third data object including the second data object.

Encoding respective components of the musical composition in a set of hierarchically-dependent data objects may include: encoding parameters of each note of the musical composition in a respective note data object; and encoding parameters of each bar of the musical composition in a respective bar data object. Encoding parameters of each note of the musical composition in a respective note data object may include, for each note of the musical composition, encoding in a respective note data object at least two note parameters selected from a group consisting of: pitch, start time, duration or length, stop time, instrument, sustain, attack, reverb, and volume. Encoding parameters of each bar of the musical composition in a respective bar data object may include, for each bar of the musical composition, encoding in a respective bar data object at least two bar parameters selected from a group consisting of: bar index, time signature, beats per minute, duration or length, start time, stop time, beat timing, key, scale, chords, tracks, sequence of notes, and sequence of percussion events. Encoding respective components of the musical composition in a set of hierarchically-dependent data objects may further include encoding at least one sequence of bar data objects in an arrangement data object. Encoding respective components of the musical composition in a set of hierarchically-dependent data objects may further include encoding each segment of the musical composition in a respective segment data object, wherein: each segment data object includes a respective sequence of bar data objects; encoding at least one sequence of bar data objects in an arrangement data object includes encoding a sequence of segment data objects in the arrangement data object; and encoding each segment of the musical composition in a respective segment data object includes encoding, in at least one segment data object, at least one segment of the musical composition selected from a group consisting of: an intro of the musical composition, a verse of the musical composition, a pre-chorus of the musical composition, a chorus of the musical composition, a bridge of the musical composition, a middle8 of the musical composition, a solo of the musical composition, and an outro of the musical composition.

Each bar in at least a first set of bars of the musical composition may include a respective sequence of notes, in which case encoding parameters of each bar of the musical composition in a respective bar data object may include, for each bar in the first set of bars of the musical composition, encoding a respective sequence of note data objects in a respective bar data object. Encoding parameters of each bar of the musical composition in a respective bar data object may include encoding at least two track data objects in at least one bar data object, each track data object including a respective sequence of note data objects.

The musical composition may include a first bar. The first bar may include a first note and the first bar may consist of (e.g., include no more or less than) a first set of beats. In this case, encoding parameters of each note of the musical composition in a respective note data object may include: encoding a pitch of the first note in a first note data object; and encoding a start time of the first note in the first note data object. Furthermore, encoding parameters of each bar of the musical composition in a respective bar data object may include: encoding the first note data object in a first bar data object; and encoding, in the first bar data object, a respective start time of each beat in the first set of beats. The start time of the first note may not be synchronized with (i.e., may be "unsynchronized with") the respective start time of any (or all) of the beats in the first set of beats.

The first bar of the musical composition may include a first sequence of notes. The first sequence of notes may include the first note, in which case encoding parameters of each note of the musical composition in a respective note data object may include encoding, in a respective note data object, a respective pitch of each note in the first sequence of notes and a respective start time of each note in the first sequence of notes.

The method may further include: generating a variation of the first bar, the variation of the first bar comprising: the first set of beats from the first bar and a second sequence of notes that is different from the first sequence of notes; and encoding the variation of the first bar in the data file. Encoding the variation of the first bar in the data file may include: encoding, in the data file, the respective start times of the beats in the first set of beats; and encoding, in the data file, a respective pitch of each note in the second sequence of notes and a respective start time of each note in the second sequence of notes. The respective start time of each note in the second sequence of notes may count from the respective start time of a respective note in the first sequence of notes and the respective start time of at least one note in the second sequence of notes may include the start time of the first note that is not synchronized with (i.e., "unsynchronized with") the respective start time of any (or all) of the beats in the first set of beats.

The combination of: i) encoding, in the first bar data object, a respective start time of each beat in the first set of beats; and ii) encoding, in a respective note data object, a respective pitch of each note in the first sequence of notes and a respective start time of each note in the first sequence of notes, may together provide a timing relationship between the notes the beats in the first bar. In this case, encoding the variation of the first bar in the data file may include applying the timing relationship between the notes and the beats of the first bar to the notes and the beats of the variation.

Encoding the variation of the first bar data object in the data file may include replacing, in the data file, the first bar data object with the variation of the first bar data object. Encoding, in the data file, the respective start times of the beats in the first set of beats may include encoding, in the first bar data object, the respective start times of the beats in the first set of beats. Encoding, in the data file, a respective pitch of each note in the second sequence of notes and a respective start time of each note in the second sequence of notes may include encoding, in the first bar data object, the respective pitch of each note in the second sequence of notes and the respective start time of each note in the second sequence of notes.

Encoding respective components of the musical composition in respective data objects may include, for at least a first note of the musical composition, encoding a set of first note parameters in a first note data object. The set of first note parameters may include a pitch of the first note and a start time of the first note, and the method may further include encoding, in the data file, a respective start time of each beat in the musical composition, wherein the start time of the first note is not synchronized with (i.e., is "unsynchronized with") the respective start time of any (or all) of the beats in the musical composition.

The musical composition may include notes and beats, and encoding respective components of the musical composition in respective data objects may include encoding respective start times of the notes and respective start times of the beats independently of one another in the data file.

Encoding the data objects in a data file may include encoding the data objects in a data file having a .hum file extension.

A system for encoding a musical composition in a digital audio format may be summarized as including: at least one processor and at least one non-transitory processor-readable storage medium communicatively coupled to the at least one processor, the at least one non-transitory processor-readable storage medium storing processor-executable instructions and/or data that, when executed by the at least one processor, cause the at least one processor to: encode respective components of a first instance of the musical composition in respective data objects; encode the data objects in a data file;

and store the data file in at least one non-transitory processor-readable storage medium of the at least one non-transitory processor-readable storage medium. The first instance of the musical composition may include a first sequence of notes and a first set of bars, in which case the data file stored in the non-transitory processor-readable storage medium may encode: the data objects in a hierarchically-dependent structure; each note of the first instance of the musical composition in a respective note data object; and each bar of the first instance of the musical composition in a respective bar data object. The first instance of the musical composition may include a first set of beats, in which case the data file stored in the non-transitory processor-readable storage medium may encode: a respective beat start time of each beat; a respective note start time of each note; and the beat start times and the note start times independently of one another to provide a timing relationship between the beats and the notes of the first instance of the musical composition in which at least one note start time is not synchronized with any beat start time.

The processor-executable instructions and/or data stored in the non-transitory processor-readable storage medium, when executed by the at least one processor, may further cause the at least one processor to generate a variation of the first instance of the musical composition. The variation of the first instance of the musical composition may include a second sequence of notes that is different from the first sequence of notes. The timing relationship between the beats and the notes of the first instance of the musical composition may be preserved in the beats and the notes of the variation of the first instance of the musical composition.

The data file stored in the non-transitory processor-readable storage medium may have a .hum file extension.

A computer program product may be summarized as including processor-executable instructions and/or data that, when the computer program product is stored in at least one non-transitory processor-readable storage medium and executed by at least one processor communicatively coupled to the at least one non-transitory processor-readable storage medium, cause the at least one processor to: encode respective components of a musical composition in respective data objects; encode the data objects in a data file; and store the data file in at least one non-transitory processor-readable storage medium of the at least one non-transitory processor-readable storage medium. The data file stored in the non-transitory processor-readable storage medium may encode: the data objects in a hierarchically-dependent structure; each note of the musical composition in a respective note data object; and each bar of the musical composition in a respective bar data object. The first instance of the musical composition may include a first set of beats, in which case the data file stored in the non-transitory processor-readable storage medium may encode: a respective beat start time of each beat; a respective note start time of each note; and the beat start times and the note start times independently of one another to provide a timing relationship between the beats and the notes of the first instance of the musical composition in which at least one note start time is not synchronized with any beat start time.

The computer program product may further include processor-executable instructions and/or data that, when executed by the at least one processor, cause the at least one processor to generate a variation of the first instance of the musical composition. The variation of the first instance of the musical composition may include a second sequence of notes that is different from the first sequence of notes. The timing relationship between the beats and the notes of the first instance of the musical composition may be preserved in the beats and the notes of the variation of the first instance of the musical composition.

The data file stored in the non-transitory processor-readable storage medium may have a .hum file extension.

A computer-implemented method of encoding a variation of a musical composition in a digital audio format, wherein the musical composition comprises a first sequence of beats and a first sequence of notes, may be summarized as including: providing a timing relationship between the beats in the first sequence of beats and the notes in the first sequence of notes; generating the variation of the musical composition, the variation comprising: the first sequence of beats; a second sequence of notes that is different from the first sequence of notes; and the timing relationship between the first sequence of beats and the first sequence of notes applied to the first sequence of beats and the second sequence of notes; and encoding the variation of the musical composition in a digital audio file. Providing a timing relationship between the beats in the first sequence of beats and the notes in the first sequence of notes may include providing a timing relationship in which a start time of at least one note in the first sequence of notes is not synchronized with a start time of any beat in the first sequence of beats.

The method may further include encoding the musical composition in the digital audio file before generating the variation of the musical composition. Encoding the variation of the musical composition in a digital audio file may include replacing the musical composition with the variation in the digital audio file.

Generating a variation of the musical composition may include: generating the second sequence of notes that is different from the first sequence of notes; and applying the timing relationship between the first sequence of beats and the first sequence of notes to the first sequence of beats and the second sequence of notes.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
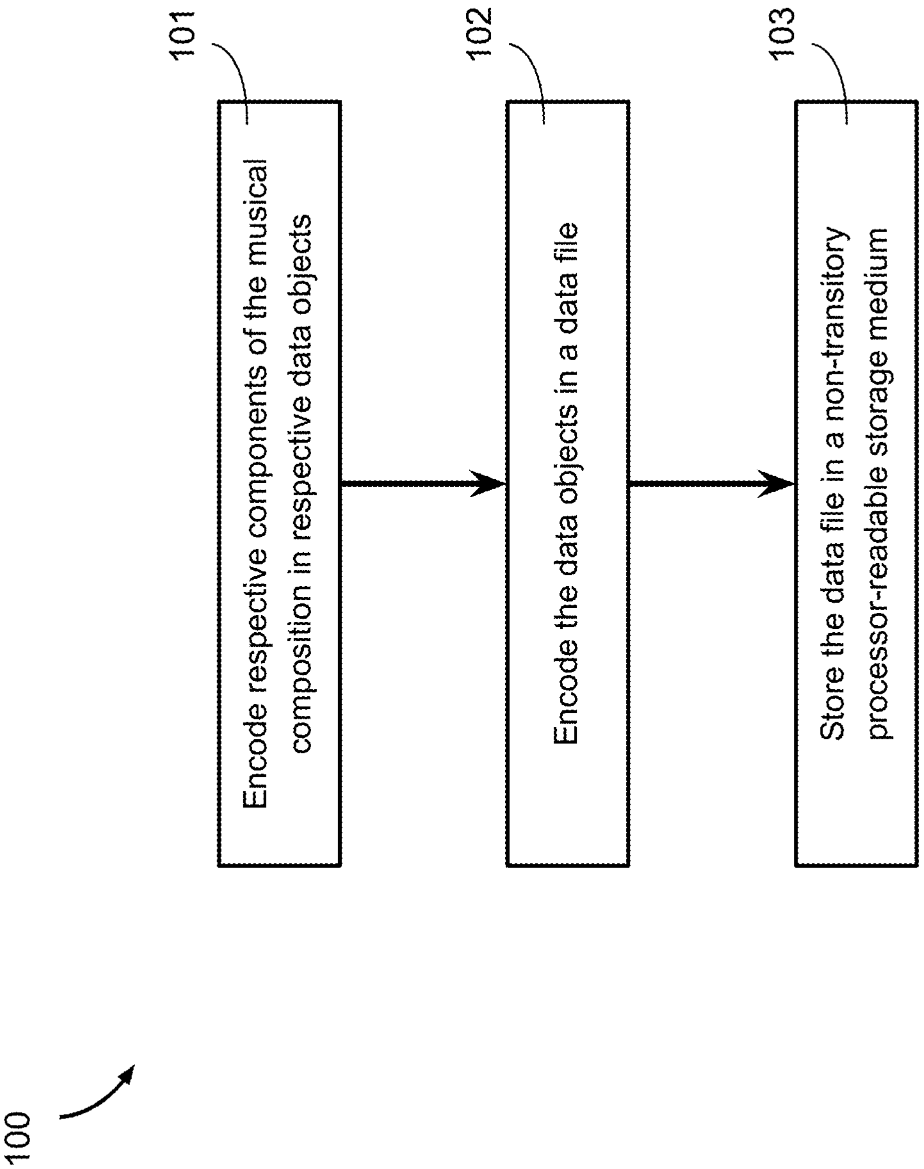
FIG. 1 is a flow diagram showing an exemplary computer-implemented method of encoding a musical composition in a digital file format in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for digital representations of music. Such digital representations include computer-readable digital audio file formats that may be readily communicated between computers and electronic instruments, and that also encode both: a) the higher-level musical concepts that fundamentally define a musical composition, and b) at least some of the nuance that gives a particular instance of the musical composition its character and expression. As will be described in more detail below, these digital audio file formats are particularly well-suited for use in computer-based composition of music, where such composition may be performed manually by a human user of a computer system, automatically by algorithms and software (e.g., artificial intelligence techniques) executed by the computer system, or by a combination of both manual (i.e., human-based) and automatic (e.g., AI-based) process steps. Algorithms and software for automatic computer-based composition of music exist in the art today but the compositions they produce tend to sound formulaic and unnatural/uninteresting to human listeners. The various implementations described herein enable computer algorithms and software to compose more sophisticated music that humans can more readily enjoy, and therefore improve the functioning of computer systems for the specific practical application of composing music.

Figure 11:
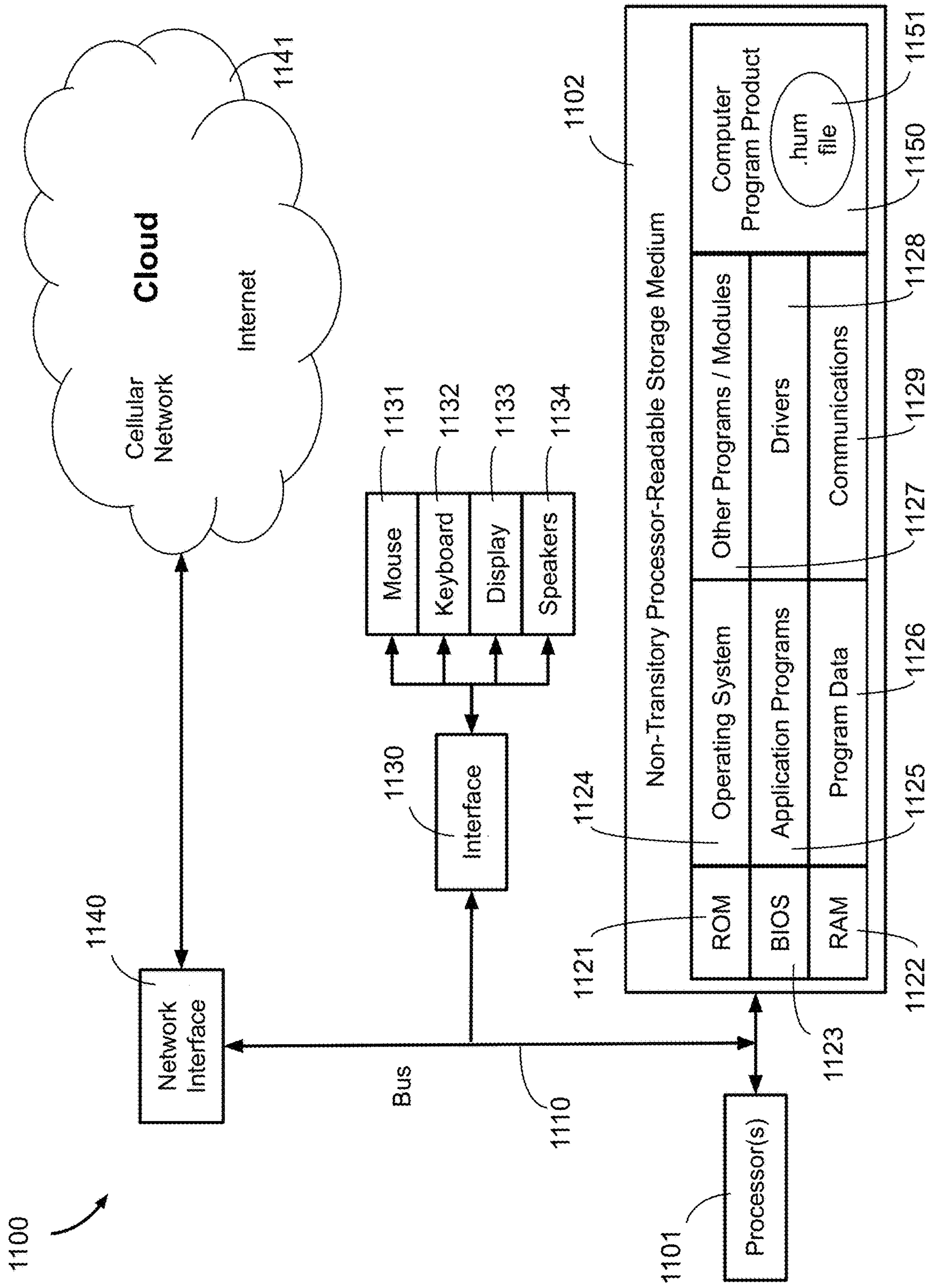
FIG. 11 is an illustrative diagram of a processor-based computer system suitable at a high level for encoding a musical composition in a digital audio format in accordance with the present systems, devices, and methods.

FIG. 1 is a flow diagram showing an exemplary computer-implemented method 100 of encoding a musical composition in a digital file format in accordance with the present systems, devices, and methods. In general, throughout this specification and the appended claims, a computer-implemented method is a method in which the various acts are performed by one or more processor-based computer system (s). For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 11, and the written descriptions thereof, provide illustrative examples of computer systems that are suitable to perform the computer-implemented methods described herein.

Throughout this specification and the appended claims, the term "encoding" (and variants, such as "to encode") is often used to describe an act, step, process, or technique carried out on or with some information by a computer processor, as in for example, "encoding a musical composition in a digital file format." Generally, "encoding" (and variants, such as "to encode") by a computer processor means representing information as, or converting information into, a form that may be: i) further processed or manipulated by a program or application software executed by the computer processor, ii) stored by the computer processor in a non-transitory processor-readable storage medium communicatively coupled to the computer processor; and/or iii) transmitted by the computer processor. Depending on the specific context, the form into which information is encoded by a computer processor may take on a wide range of different forms, including without limitation: processor-executable instructions such as computer code or program code; program data; digital data represented using the binary number system; symbolic data represented using a finite alphabet of symbols; a structured representation containing symbolic and/or numeric data; as a graph or tree of symbols from a finite alphabet, whose nodes represent symbols and whose edges represent hierarchical relationships between symbols; and/or a transmittable digital form such as a series of impulses.

Returning to FIG. 1, method 100 includes three acts 101, 102, and 103, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, respective components of the musical composition are encoded in respective data objects. The respective components of the musical composition may be encoded in respective data objects by, for example, at least one processor, or by a combination of at least one processor and at least one non-transitory processor-readable storage medium with which the at least one processor is communicatively coupled. Examples of specific components of a musical composition that may be encoded in respective data objects are described in depth later on and may vary in different implementations, but in general such components may include concepts from modern musical theory such as any or all of: notes, percussion events, chords, bars, tracks, segments (e.g., intro, verse, pre-chorus, chorus, bridge, middle8, solo, outro, etc.), and the like.

Throughout this specification and the appended claims, reference is often made to a "data object." Unless the specific context requires otherwise, the term "data object" is used herein to refer to a collection or set of data that is combined or amalgamated into a discretely addressable object. A data object may exist in the source code, object code, computer code, and/or program code of a computing environment where it is defined, interpreted, and manipulated, and a data object may have an analog or physical counterpart in the non-transitory processor-readable storage medium where it is stored and called or operated upon. In this case, "encoding" a component of a musical composition in a data object may include writing, by at least one processor, the component to the data object in the non-transitory processor-readable storage medium and/or forming, by at least one processor, the component(s) in the data object stored in the non-transitory processor-readable storage medium. As will be described in more detail later on, one data object may include (e.g., contain, encompass, reference, or invoke) one or more additional data object(s).

At 102, the data objects are encoded in a data file. The data objects may be encoded in the data file by, for example, at least one processor, or by a combination of at least one processor and at least one non-transitory processor-readable storage medium with which the at least one processor is communicatively coupled.

Throughout this specification and the appended claims, reference is often made to a "data file." Unless the specific context requires otherwise, the term "data file" is used herein to refer to an organized or structured collection or set of data objects (as well as any additional data that may be included, such as input data, output data, metadata, and so on) that are combined or amalgamated into a computer file. A data file may be stored in a non-transitory processor-readable storage medium, transmitted between computer systems, and used by one or more computer programs, applications, or systems. In this case, "encoding" a data object in a data file may include writing, by at least one processor, the data object to the data file and/or forming, by at least one processor, the data object in the data file.

At 103, the data file is stored in a non-transitory processor-readable storage medium. The data file may be stored in the non-transitory processor-readable storage medium by the non-transitory processor-readable storage medium itself, and/or by at least one processor communicatively coupled to the non-transitory processor-readable storage medium. The non-transitory processor-readable storage medium may be local to the at least one processor and communicatively coupled thereto by electrical communication conduits such as a computer bus and/or other tangible computer hardware, or the non-transitory processor-readable storage medium may be remote and physically-separated from the at least one processor and communicatively coupled thereto by a communication network, such as a cellular network or the internet.

Method 100 provides an illustrative example of producing a digital representation of music in which respective components of a musical composition are encoded in respective data objects within a data file. The structure of the resulting data file is unlike that of other digital audio file formats available today, and accordingly such a data file may be identified by a new type of file extension. A data file constructed in accordance with the present systems, devices, and methods may, in some implementations, be hierarchical in structure and may be given a .hum file extension. That is, in some implementations of method 100, at 102 the data objects may be encoded in a data file having a .hum file extension, and at 103 the data file having the .hum file extension may be stored in the non-transitory processor-readable storage medium. A .hum file format may stand for a Hierarchical Universal Music file format. Exemplary hierarchical aspects of the digital representations of music described herein are introduced in FIG. 2.

Figure 2:
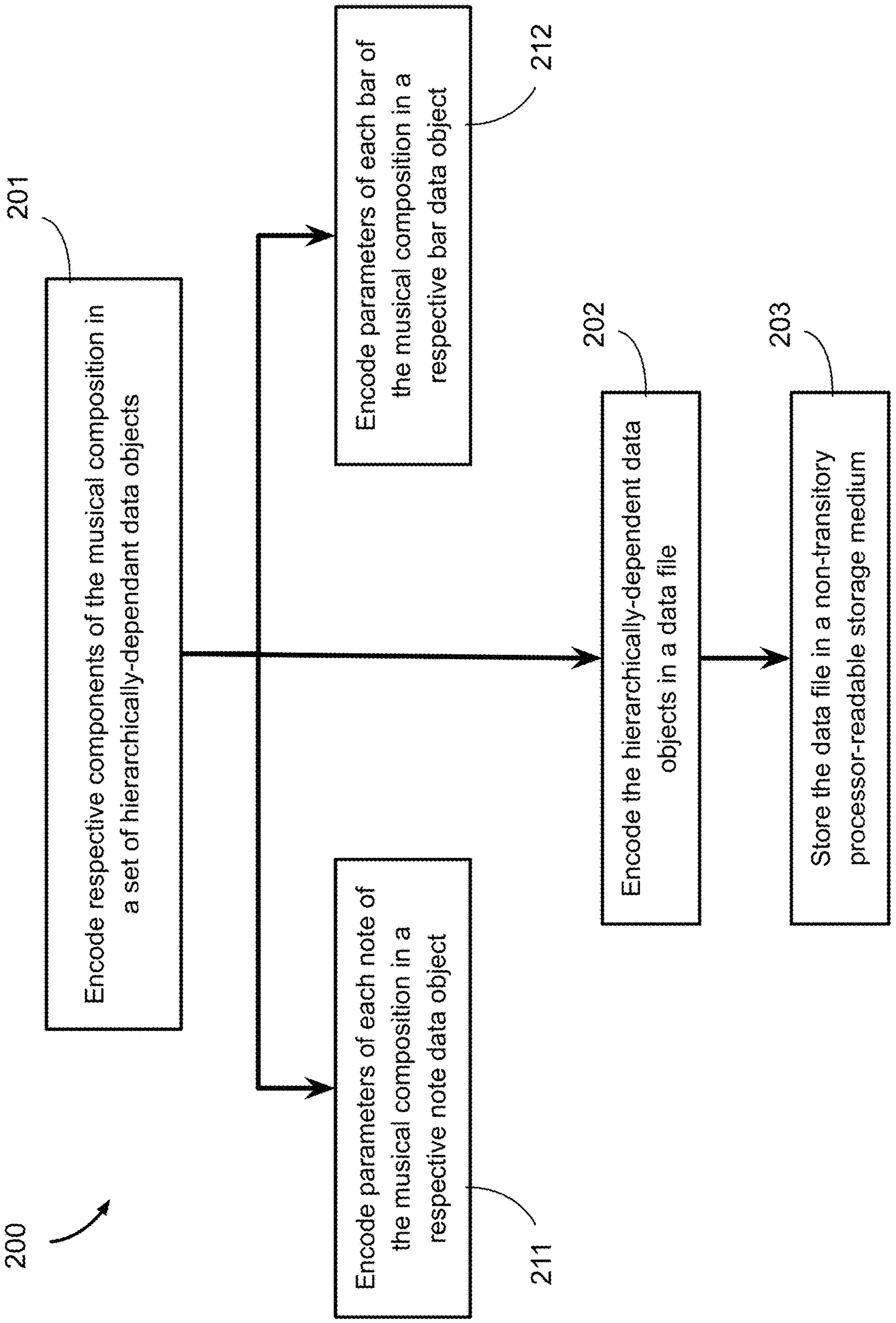
FIG. 2 is a flow diagram showing another exemplary computer-implemented method of encoding a musical composition in a digital file format in accordance with the present systems, devices, and methods.

FIG. 2 is a flow diagram showing an exemplary computer-implemented method 200 of encoding a musical composition in a digital file format in accordance with the present systems, devices, and methods. Method 200 includes three main acts 201, 202, and 203 and main act 201 includes two sub-acts 211 and 212. Those of skill in the art will appreciate that in alternative implementations certain acts and/or sub-acts may be omitted and/or additional acts and/or sub-acts may be added. Those of skill in the art will also appreciate that the illustrated order of the acts and/or sub-acts is shown for exemplary purposes only and may change in alternative implementations.

Generally, acts 201, 202, and 203 of method 200 are substantially similar to acts 101, 102, and 103, respectively, of method 100 from FIG. 1, except that method 200 includes additional specificity for the purposes of illustrating an exemplary implementation of the present systems, devices, and methods.

For example, at 101 of method 100 respective components of the musical composition are generally encoded in respective data objects. Act 201 of method 200 provides a more specific illustrative implementation in which respective components of the musical composition are encoded in a set of hierarchically-dependent data objects. The respective components of the musical composition may be encoded in a set of hierarchically-dependent data objects by, for example, at least one processor, or by a combination of at least one processor and at least one non-transitory processor-readable storage medium with which the at least one processor is communicatively coupled. Throughout this specification and the appended claims, the term "hierarchically-dependent" refers to an organizational scheme in which some objects (e.g., data objects) contain, encompass, refer to, invoke, or depend on (i.e., generally and hereinafter "include") one or more other object(s) (e.g., data object(s)) to give rise to a hierarchical structure having, for example, a top-most object and at least one bottom-most object. As will be described in more detail later on, in some implementations the resulting structure may be a tree structure or pyramid structure characterized by at least one top-most object and many bottom-most objects, with various layers of intermediate objects therebetween. In some implementations, hierarchically-dependent data objects may be hierarchically-nested. For greater certainty, in a "set of hierarchically-dependent data objects," some data objects are dependent on other data objects and some data objects may be independent of other data objects. A person of skill in the art will appreciate that in the hierarchically-dependent "tree structures" described and illustrated herein objects at different levels (e.g., an object nested within another object and/or vertically-separated from another object in illustration) exhibit hierarchical dependence while objects at a same or common level (e.g., not nested within a particular other object and/or only horizontally-separated from a particular other object in illustration) exhibit at least some independence.

The set of hierarchically-dependent data objects may include, for example, a first data object, a second data object that includes (i.e., contains, encompasses, refers to, invokes, and/or depends on) the first data object, and a third data object that includes the second data object. In this example, encoding respective components of the musical composition in the set of hierarchically-dependent data objects at 201 may include encoding a first component of the musical composition in the first data object; encoding a second component of the musical composition in the second data object, the second data object including the first data object; and encoding a third component of the musical composition in the third data object, the third data object including the second data object. If a fourth data object is also included in the third data object and not otherwise connected to the first data object or the second data object, then the fourth data object may be said to be hierarchically-dependent on the third data object but exhibiting at least some independence from the second data object and the first data object.

In addition to specifying an exemplary hierarchically-dependent structure for the data objects, method 200 also breaks main act 201 into sub-acts 211 and 212 to provide illustrative examples of particular components of the musical composition that may be encoded in the set of hierarchically-dependent data objects. Sub-acts 211 and 212 are intended to be illustrative only and are not meant to represent either: a) an exhaustive set of all sub-acts that may be included in or performed as part of main act 201, or b) an exhaustive set of all components of the musical composition that may be encoded in the set of hierarchically-dependent data objects in accordance with the present systems, devices, and methods.

At 211, parameters of each note of the musical composition are encoded in a respective note data object. In other words, for each note in the musical composition, a corresponding note data object is defined/created and parameters of that note are encoded in the corresponding note data object. The parameters of each note of the musical composition may be encoded in a respective note data object by, for example, at least one processor, or by a combination of at least one processor and at least one non-transitory processor-readable storage medium with which the at least one processor is communicatively coupled.

Throughout this specification and the appended claims, unless the specific context requires otherwise the term "note" is generally used to refer to a musical note (such as Ab, A, A#, Bb, B, C, C#, Db, D, D#, Eb, E, F, F#, Gb, G, G# (of any octave), and theoretical notes such as Cb, which is enharmonic to B) and is inclusive of rests (i.e., a note with a certain timing but no pitch or volume). A person of skill in the art will appreciate that the "parameters" of a note, or "note parameters," may include any or all concepts used to characterize notes in modern musical theory, including without limitation: pitch, start time, stop time, duration, volume, attack, reverb, decay, sustain, and instrument (e.g., tone, timbre, relative harmonics, and the like). Thus, a "note data object" is a data object that encodes a note, including its applicable note parameters.

A musical composition may include percussion events that have no tonal pitch but are used to impart rhythm. Throughout this specification and the appended claims, unless the specific context requires otherwise the term "note" is inclusive of percussion events. A percussion event may be defined or characterized by note parameters that generally do not include a pitch and generally specify a percussion instrument as the instrument. A "note data object" as described herein may be used to encode notes and note parameters, as well as percussion events and percussion event parameters. Thus, unless the specific context requires otherwise, a "note data object" may encode a tonal note event or a rhythmic percussion event depending on the specific implementation; however, in some implementations of the present systems, devices, and methods notes and percussion events may be encoded in different data objects. In implementations in which notes and percussion events are encoded in different data objects, note parameters may be encoded in note data objects and percussion event parameters may be encoded in "percussion event data objects." The parameters used as "percussion event parameters" may be substantially similar to the parameters used as note parameters (described above), with the exception that percussion event parameters may not include pitch (and, of course, the instrument specified for a percussion event parameter will generally be a percussion instrument). Thus, a "percussion event data object," if and when implemented in addition to note data objects, is a data object that encodes a percussion event, including its applicable percussion event parameters.

At 212, parameters of each bar of the musical composition are encoded in a respective bar data object. In other words, for each bar in the musical composition, a corresponding bar data object is defined/created and parameters of that bar are encoded in the corresponding bar data object. The parameters of each bar of the musical composition may be encoded in a respective bar data object by, for example, at least one processor, or by a combination of at least one processor and at least one non-transitory processor-readable storage medium with which the at least one processor is communicatively coupled. As will be discussed in more detail later on, each bar in at least a first set of bars of the musical composition may include a respective sequence of notes, and at 212 encoding parameters of each bar of the musical composition in a respective bar data object may include, for each bar in the first set of bars of the musical composition, encoding a respective sequence of note data objects in a respective bar data object.

Throughout this specification and the appended claims, unless the specific context requires otherwise the term "bar" is generally used to refer to a musical bar; i.e., a portion of time comprising a set number of beats from a musical composition. The number of beats in a bar depends on the time signature for the musical composition. A person of skill in the art will appreciate that the "parameters" of a bar, or "bar parameters," may include any or all concepts used to characterize bars in modern musical theory, including without limitation: bar index, time signature, beats per minute, duration, start time, stop time, beat times, key, scale, chords, tracks, sequence of notes, and (if applicable) sequence of percussion events. Thus, a "bar data object" is a data object that encodes a bar, including its applicable bar parameters.

Sub-acts 211 and 212 of method 200 specify examples of certain components of a musical composition that may be encoded in respective hierarchically-dependent data objects at 201; namely, notes and bars, respectively. Various implementations of the present systems, devices, and methods may encode notes and bars in respective data objects, and various implementations of the present systems, devices, and methods may encode additional or alternative components of a musical composition in respective data objects. For example, an arrangement of a musical composition may be encoded in an arrangement data object. The arrangement may be represented by, for example, at least one sequence of bar data objects and encoding respective components of the musical composition in a set of hierarchically-dependent data objects at 201 of method 200 may include encoding the at least one sequence of bar data objects in the arrangement data object. As a further example, various elements or "segments" of the musical composition may be encoded in respective segment data objects. In this context, the term "segment" is used to refer to a sequence of bars (i.e., a subset of bars) that represents a particular section or portion of the musical composition, such as an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition. Generally, encoding respective components of the musical composition in a set of hierarchically-dependent data objects at 201 of method 200 may include encoding each segment (e.g., intro, verse, pre-chorus, chorus, bridge, middle8, solo, or outro) of the musical composition in a respective segment data object, and encoding at least one sequence of bar data objects in an arrangement data object may include encoding a sequence of segment data objects in the arrangement data object. Hierarchically, in this illustrative example the arrangement data object may include the segment data objects, each segment data object may include a respective set or sequence of bar data objects, and each bar data object may include a respective set or sequence of note data objects.

Following act 201, including corresponding sub-acts 211 and 212 in the illustrated implementation of FIG. 2, method 200 proceeds to acts 202 and 203, respectively.

At 202, the hierarchically-dependent data objects are encoded in a data file similar to act 102 from method 100.

At 203, the data file is stored in a non-transitory processor-readable storage medium similar to act 103 from method 100.

As previously described, in implementations of digital representations of music that employ a set of hierarchically-dependent data objects in accordance with the present systems, devices, and methods, the resulting data structure may be a tree structure or pyramid structure characterized by at least one top-most object and many bottom-most objects, with various layers of intermediate objects therebetween.

Figure 3:
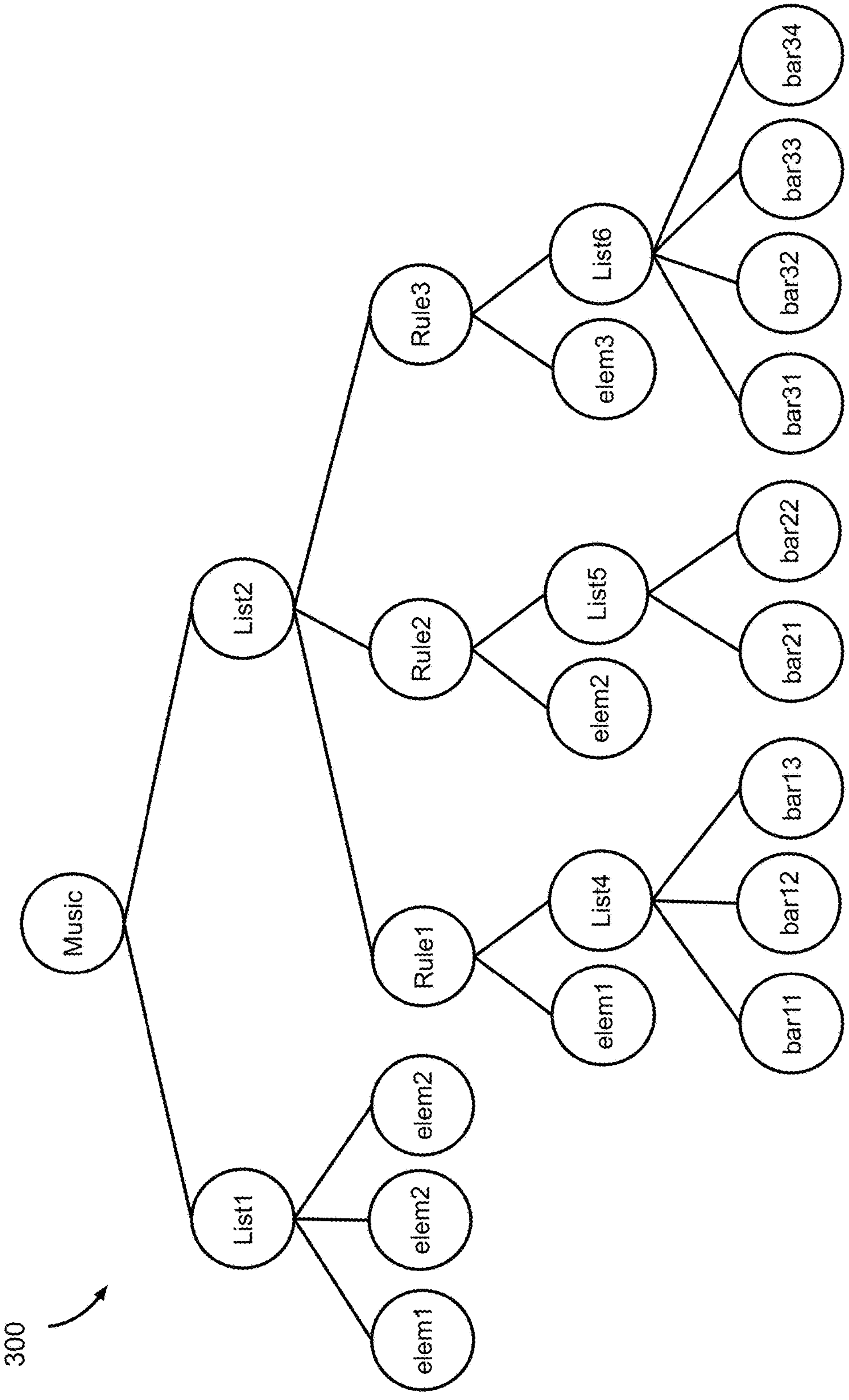
FIG. 3 is an illustrative diagram showing a visual representation of a tree-like data structure of a hierarchical digital audio file format encoded in accordance with the present systems, devices, and methods.

FIG. 3 is an illustrative diagram showing a visual representation of a tree-like data structure 300 of a hierarchical digital audio file format encoded in accordance with the present systems, devices, and methods. Data structure 300 comprises a set of hierarchically-dependent data objects including a top-most data object and several layers of lower-level data objects dependent thereon. The complete data structure 300 illustrated in FIG. 3 is given by:

Music[{seg1, seg2, seg3}, {seg1→{bar11, bar12, bar13}, seg2→{bar21, bar22}, seg3→{bar31, bar32, bar33, bar34}}]

where Music[ ] is the top-most data object. At a first level within the Music[ ] data object, Music[ ] includes two lists, List1{ } and List2{ }. List1{ } includes a set of segment data objects {seg1, seg2, seg3} and may, in some implementations, represent a particular arrangement (e.g., an arrangement data object) of the musical composition. That is, the segments of the musical composition may be played in the order in which they appear in the "arrangement data object" List1{ }.

List2{ } includes a set of rules {Rule1, Rule2, Rule3} that map the respective segment data objects to respective sequences of bar data objects. That is, Rule1 maps the segment data object seg1 to the sequence of bar data objects given by List3{bar11, bar12, bar13}; Rule2 maps the segment data object seg2 to the sequence of bar data objects given by List4{bar21, bar22}; and Rule3 maps the segment data object seg3 to the sequence of bar data objects given by List5{bar31, bar32, bar33, bar34}. The musical composition encoded in the Music[List1{ }, List2{ }] data object therefore corresponds to the following complete sequence of bars (with each bar encoded in and represented by a respective bar data object):

bar11, bar12, bar13, bar21, bar22, bar31, bar32, bar33, bar34

By decoupling the arrangement (i.e., List1) from the rules mapping the segments to sequences of bars (i.e., List2), either the arrangement or the rules can readily be modified to produce variations of the musical composition. For example, a first variation of the Music[ ] musical composition may be defined or encoded as v1Music[ ] and may comprise a simple rearrangement of the segment data objects in a new arrangement data object given by vList1{ }. If List2{ } remains unchanged and vList1{ } is programmed to encode an alternative sequence of the segment data objects vList1{seg2, seg3, seg1}, then the variation of the musical composition encoded in the v1Music[vList1{ }, List2{ }] data object corresponds to the following rearranged sequence of bars (with each bar encoded in and represented by a respective bar data object):

bar21, bar22, bar31, bar32, bar33, bar34, bar11, bar12, bar13

As another example, the rules of List2{ } may be changed and encoded in a new data object vList2{ }. For example, vRule1 may map the segment data object seg1 to the sequence of bar data objects given by List3{bar13, bar12, bar11}; vRule2 may map the segment data object seg2 to the sequence of bar data objects given by List4{bar22, bar21}; and vRule3 may map the segment data object seg3 to the sequence of bar data objects given by List5{bar33, bar31, bar34, bar32}. In this case, a new variation of the musical composition may be encoded in v2Music[List1{ }, vList2{ }], which corresponds to the following sequence of bars:

bar13, bar12, bar11, bar22, bar21, bar33, bar31, bar34, bar32

The above are two simple examples of how the hierarchical data structures described herein introduce a modularity that may be exploited, e.g., by computer-based music composition algorithms, to readily generate and vary musical compositions.

As is apparent in data structure 300, the various implementations of data structures described herein may include data objects and additional elements other than data objects, such as rules, lists, and other components or parameters. A person of skill in the art will appreciate that data structure 300 of FIG. 3 is intended only as an illustrative example of a high-level Music[ ] data object in accordance with the present systems, devices and methods and various implementations may employ wildly different data structures with more, fewer, and/or different parameters and/or data objects than those illustrated in FIG. 3. Data structure 300 is not intended to represent a complete data structure of a complete musical composition. Indeed, data structure 300 represents only a "sub-structure" of a complete data structure and various data objects in data structure 300 may include further data objects similarly related in a hierarchically-dependent structure within the Music[ ] data object. As a particular example, a representative data structure of the bar11[ ] data object from data structure 300 is illustrated in FIG. 4.

Figure 4:
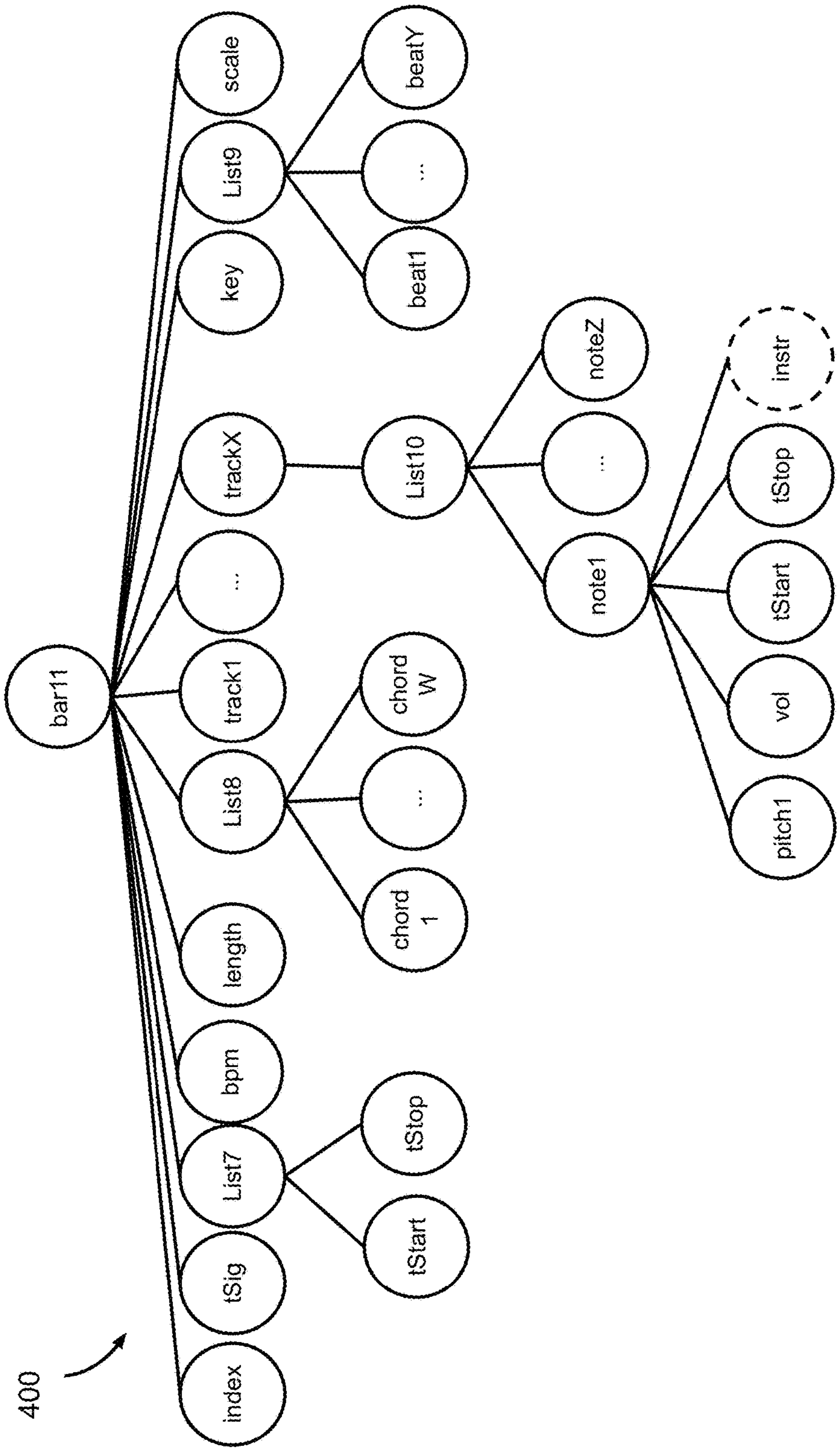
FIG. 4 is an illustrative diagram showing a visual representation of a tree-like data structure of an exemplary bar data object bar11[ ] from the data structure of FIG. 3, encoded in accordance with the present systems, devices, and methods.

FIG. 4 is an illustrative diagram showing a visual representation of a tree-like data structure 400 of an exemplary bar data object bar11[ ] from data structure 300 of FIG. 3 encoded in accordance with the present systems, devices, and methods. Data structure 400 comprises a set of hierarchically-dependent data objects including a top-most data object and several layers of lower-level data objects dependent thereon. The complete data structure 400 illustrated in FIG. 4 is given by:

bar11[index, tSig, {tStart, tStop}, bpm, length, {chord1, . . . , chordW}, track1, . . . , trackX, key, {beat1, . . . , beatY}, scale]

trackX[{note1, . . . , noteZ}]

note1[pitch1, vol, tStart, tStop, instr]

bar11[ ] is the top-most data object with respect to data structure 400; however, bar11[ ] is included as a lower-level data object in data structure 300 of FIG. 3. Data structure 400 represents a "sub-structure" of the bar11[ ] data object from data structure 300 of the Music[ ] data object.

The bar11[ ] data object includes, encoded at a first level, various bar parameters such as: index (bar index), tSig (time signature), List7{tStart, tStop} (bar start time and bar stop time), bpm (beats per minute), length (bar duration), List8{chord1, . . . , chordW} (chords used in the bar, from chord1 up to chordW when there are W chords used, where W is an integer greater than 1), track1, . . . , trackX (tracks that may overlap in the bar and correspond to different instruments played over the same time period, from track1 up to trackX when there are X tracks used, where X is an integer greater than 1), key (key signature), List9 {beat1, . . . , beatY} (beat start times in the bar, from beat1 up to beatY when the bar contains Y beats, where Y is an integer greater than 1), and scale. A person of skill in the art will appreciate that the foregoing list of bar parameters (corresponding to those which are illustrated in data structure 400) is used for illustrative purposes only and is not intended to be a limiting or exhaustive list of bar parameters that may be included in alternative implementations. Furthermore, a person of skill in the art will appreciate that the order in which parameters are presented in the bar11[ ] data object, and generally in any data object throughout this specification including the Figures, is used for illustrative purposes only and not intended to be limiting in any way. Different implementations of the present systems, devices, and methods may arrange lists and/or parameters in orders other than the orders used for illustrative purposes herein.

As illustrated in data structure 400, the bar parameters of the bar11[ ] data object include further data objects, some of which have their own respective hierarchically-dependent data objects. For example, the trackX[ ] data object includes List10{note1, . . . , noteZ} (a sequence of Z notes included in trackX of bar11, where Z is an integer greater than 1). The note1 data object further includes a set of note parameters: pitch (the pitch of note1, such as A# or F), vol (the volume of note1), tStart (the start time of note1), tStop (the stop time of note1), and an instr parameter specifying the instrument of note1, such as any or all of guitar, piano, percussion, vocals, and the like. In some implementations, the instr parameter may be any instrument selected from the set of all MIDI tonal instruments and/or all MIDI percussion instruments. As previously described, in some implementations percussion events may be encoded in note data objects, such as note1[ ], that omit pitch information; however, in other implementations a bar data object, such as bar11[ ], may further include percussion event data objects in addition to note data objects, such as:

percussion1[vol, tStart, tStop]

where a percussion event data object may include at least vol (volume), tStart (start time), and tStop (stop time) percussion event parameters but notably need not include a pitch parameter.

Throughout this specification and the appended claims, reference is often made to a "track." Unless the specific context requires otherwise, the term track is used herein to refer to a collection or sequence of notes that are all "played by" the same instrument in a musical composition. For example, a musical composition that is for or by a single instrument may have only one track, but a musical composition that is for or by multiple instruments concurrently may have multiple tracks that are temporally overlaid on one another. Each respective bar of a musical composition may include multiple tracks, where each track provides the sequence of notes of a respective instrument throughout the duration of that bar. Thus, in the present systems, device, and methods, a bar data object may include at least two tracks (which may be encoded, for example, as bar parameters or as track data objects), and each respective track (or each respective track data object) may include a respective list or sequence of note data objects encoding note parameters that specify: i) note start/stop times that span the duration of the same bar; and ii) different pitches or instruments. In implementations in which note data objects and percussion event data objects are encoded separately, a track (or track data object) may include a list of percussion event data objects encoding percussion event parameters. In data structure 400, the instr parameter is defined at the note level (e.g., as shown for the exemplary note1 data object); however, in alternative implementations the instr parameter may be defined at the track level (e.g., trackX[{note1, . . . , noteZ}, instr] and applied "globally" to all notes in the track. The instr parameter of note1 is shown in a dotted circle in FIG. 4 to emphasize that the position of the instr parameter in the hierarchy of data structure 400 is instance-specific and, in alternative implementations, the instr parameter may be positioned elsewhere in the hierarchy or data structure 400 (such as adjacent List10 as a parameter of trackX).

In some implementations, chords may be defined by chord parameters that are encoded in chord data objects (e.g., hierarchically-nested within bar data objects). Exemplary chord parameters that may be encoded in a chord data object include, without limitation: root note of the chord, scale degrees of the chord, key, scale, chord notes, chord inversion, chord bass octave, chord timing (arpeggiation pattern), chord instrument, and/or chord volume. The key and scale of a chord (or chords) may or may not match that of the bar that contains it (or them). This allows for the use of so-called "borrowed chords." Generally, it is possible (if desired) to have a plurality of chords in a single bar. The plurality of chords could be stacked in time or started consecutively within the temporal boundaries of the enclosing bar.

A person of skill in the art will appreciate that data structure 400 of FIG. 4 is intended only as an illustrative example of the present systems, devices and methods and various implementations of bar data objects may employ wildly different data structures including more, fewer, and/or different parameters and/or data objects than those illustrated in FIG. 4. A person of skill in the art will also appreciate that the encoding of even a simple complete musical composition in accordance with the present systems, devices, and methods may give rise to a hierarchically-dependent data structure that is so large and detailed that any labelling applied to the data objects in an illustration would be illegible. As an example, the data structure of a simple musical composition employing only six bars is provided in FIG. 5.

Figure 5:
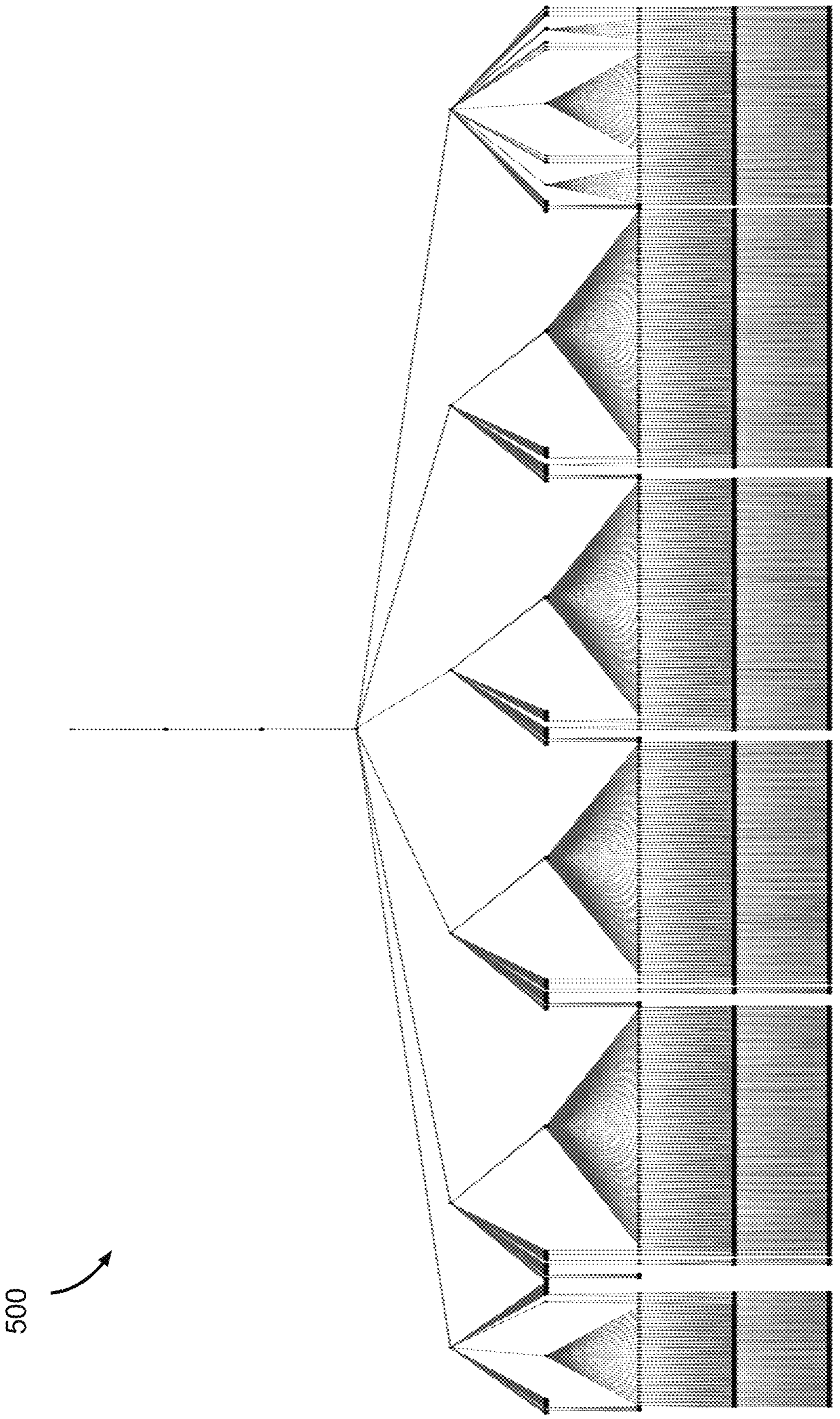
FIG. 5 is an illustrative diagram showing a visual representation of a data structure corresponding to an exemplary musical composition encoded in accordance with the present systems, devices, and methods.

FIG. 5 is an illustrative diagram showing a visual representation of a data structure 500 corresponding to an exemplary musical composition encoded in accordance with the present systems, devices, and methods. The musical composition encoded in data structure 500 is relatively simple and includes only six bars, and yet data structure 500 is too dense to include legible labels in FIG. 5. Data structure 300 from FIG. 3 and data structure 400 from FIG. 4 each represents only a respective portion or sub-structure of a larger data structure and therefore each has sufficient space for legible labels. By comparison, data structure 500 represents a complete data structure and is much too dense to include legible labels. This is the case even though the musical composition encoded in data structure 500 includes only six bars. A typical musical composition includes dozens of bars and, when encoded in a set of hierarchically-dependent data objects, results in a data structure that is significantly larger even than data structure 500.

Data structure 300 of FIG. 3, data structure 400 of FIG. 4, and data structure 500 of FIG. 5, provide illustrative examples of hierarchically-dependent data structures that are not intended to limit the scope of the present disclosure in any way. Each unique musical composition corresponds to a uniquely encoded data structure in the present systems, devices, and methods, meaning there are as many different possible visual illustrations of hierarchically-dependent data structures as there are possible musical compositions.

In some implementations, a complete musical composition may be encoded in a single data object (e.g., a single top-level Music[ ] data object that includes any number of hierarchically-dependent data objects therein or thereunder); however, in other implementations the encoding of a complete musical composition may span multiple data objects, such as {Music1[ ], . . . , MusicN[ ]}, where N is an integer greater than 1. In this case, depending on the particular encoding, there may be an even higher-level data object that includes the set of {Music1[ ], . . . , MusicN[ ]} data objects, or the top-level of the encoded data structure may simply include a list of all Music[ ] data objects in the set of {Music1[ ], . . . , MusicN[ ]} data objects.

The various implementations described herein include systems, devices, and methods for digital audio file formats in which respective components of a musical composition are encoded in respective data objects and the respective data objects are organized in a hierarchically-dependent data structure. The structure of these hierarchical digital audio file formats has numerous advantages over established digital audio file formats (e.g., .wav, .midi, .mp3, and the like) in relation to certain applications, such as in the computer-based creation of musical compositions. For example, with various concepts from modern musical theory (e.g., notes, bars, segments, arrangements, and the like) each corresponding to respective data objects, such data objects may readily be rearranged, manipulated, and/or individually modified to produce musical variations of a composition. Furthermore, certain data objects and/or parameters within data objects (e.g., timing parameters) may be independently adjusted (e.g., misaligned relative to one another) in order to introduce nuance and expressiveness to a musical composition that may exist in a typical instance of a human performance but may not otherwise be easily transcribable in sheet music. Exemplary methods that take advantage of these capabilities of the hierarchical digital representations of music described herein are illustrated in FIG. 6, FIG. 7, FIGS. 8A and 8B, and FIG. 9.

Figure 6:
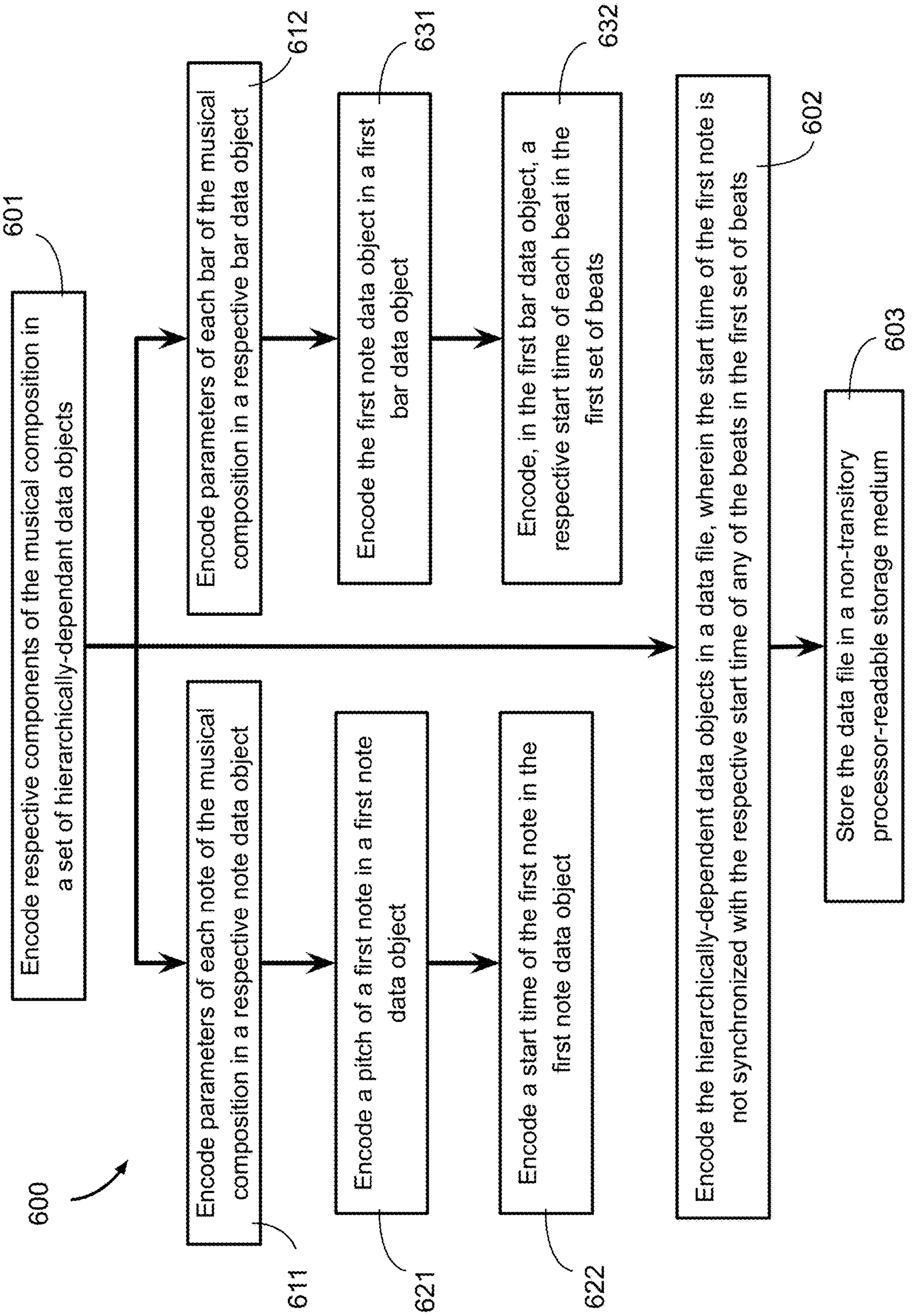
FIG. 6 is a flow diagram showing another exemplary computer-implemented method of encoding a musical composition in a digital file format in accordance with the present systems, devices, and methods.

FIG. 6 is a flow diagram showing an exemplary computer-implemented method 600 of encoding a musical composition in a digital file format in accordance with the present systems, devices, and methods. In method 600, the musical composition includes a first bar and the first bar includes both a first note and a first set of beats. Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

Method 600 includes three main acts 601, 602, and 603. Main act 601 includes two sub-acts 611 and 612; sub-act 611 includes two additional sub-acts 621 and 622; and sub-act 612 includes two additional sub-acts 631 and 632. Those of skill in the art will appreciate that in alternative implementations certain acts and/or sub-acts may be omitted and/or additional acts and/or sub-acts may be added. Those of skill in the art will also appreciate that the illustrated order of the acts and/or sub-acts is shown for exemplary purposes only and may change in alternative implementations.

Generally, acts 601, 602, and 603 of method 600 are substantially similar to acts 201, 202, and 203, respectively, of method 200 from FIG. 2, except that method 600 provides a specific example of encoding a first note of a first bar of the musical composition for the purposes of illustrating an exemplary implementation of the present systems, devices, and methods.

At 601, respective components of the musical composition are encoded in a set of hierarchically-dependent data objects similar to act 201 of method 200. Also similar to method 200, method 600 likewise breaks main act 601 into sub-acts 611 and 612 to provide illustrative examples of particular components of the musical composition that may be encoded in the set of hierarchically-dependent data objects. At 611, parameters of each note of the musical composition are encoded in a respective note data object similar to sub-act 211 of method 200, and at 612, parameters of each bar of the musical composition are encoded in a respective bar data object similar to sub-act 212 of method 200.

Sub-act 611 includes two additional sub-acts, 621 and 622. That is, in method 600, the act of encoding parameters of each note of the musical composition in a respective note data object at 611 involves performing sub-acts 621 and 622, each of which relates to the encoding of a respective specific parameter of the first note of the musical composition in a first note data object.

At 621, a pitch of the first note is encoded in the first note data object and at 622, a start time of the first note is encoded in the first note data object. Pitch and start time are respective parameters of the first note. The pitch and start time of the first note may be encoded in the first note data object by, for example, at least one processor, or by a combination of at least one processor and at least one non-transitory processor-readable storage medium with which the at least one processor is communicatively coupled.

In a way similar to sub-act 611, sub-act 612 includes two additional sub-acts, 631 and 632. In method 600, the act of encoding parameters of each bar of the musical composition in a respective bar data object at 612 involves performing sub-acts 631 and 632, each of which relates to the encoding of a respective specific parameter of the first bar of the musical composition in a first bar data object.

At 631, the first note data object is encoded in the first bar data object and at 632, a respective start time of each beat in the first set of beats is encoded in the first bar data object. The first note and the start times of the beats in the first set of beats are parameters of the first bar. The first note data object and the respective start time of each beat in the first set of beats may be encoded in the first bar data object by, for example, at least one processor, or by a combination of at least one processor and at least one non-transitory processor-readable storage medium with which the at least one processor is communicatively coupled.

An exemplary advantage of the present systems, devices, and methods for digital representations of music is that the note parameters (e.g., the start time of the first note) and the bar parameters (e.g., the respective start times of each beat in the first set of beats) may be defined and programmed substantially independently of one another. In conventional sheet music, the time signature of a piece defines a number of beats per bar, the beats are precisely and uniformly spaced within each bar, and the notes are precisely synchronized with or counted from the beats. That is, in conventional sheet music the start time of each note is synchronized with (e.g., temporally aligned with or snapped to) or counted from (e.g., based on or derived from) the start time of a respective beat. Sheet music transcribes an idealization of a musical composition that is rarely if ever achieved in a performance by a human musician. The imperfection of human performance typically results in slight variations, misalignments, or "unsynchronizations" between note start times and beat times which can add nuance or expression that may actually be enjoyed by the listener. Indeed, when a machine or computer plays or performs sheet music, the result is typically "too perfect" (with all note timing perfectly synchronized with or counted from all beat timing) and the performance ends up sounding unnaturally perfect and robotic. In accordance with the present systems, devices, and methods, digital representations of music in which the note timing and the beat timing are defined and programmed independently of one another readily enables computer-based generation of musical compositions that, when played back by a machine or computer, have a more nuanced and expressive sound (compared to other approaches in the art) that may be preferred by a human listener.

Method 600 provides a specific exemplary implementation of the unsynchronization feature described above. At 622, a start time of the first note is encoded in the first note data object and at 632, a respective start time of each beat in the first set of beats is encoded in the first bar data object. In method 600, the start time of the first note is deliberately not synchronized with the respective start time of any of the beats in the first set of beats.

Throughout this specification and the appended claims, reference is often made to a note (e.g., a first note) having a start time that is "not synchronized with" the start time of any beat. In this context, "synchronized" generally means aligned in time to an extent necessary to be perceived as synchronous by the human ear, and "not synchronized" or "unsynchronized" means unaligned or misaligned in time to an extent necessary to be perceived as asynchronous by the human ear. The precise quantified timing boundary between "synchronized" and "not synchronized" or "unsynchronized" may vary in different implementations and may depend on other factors, such as the note parameters being employed. As a first example, in some implementations "synchronized" may mean aligned in time within ±100 ms (e.g., if the beat start time is 01:12:000, then the corresponding note start time is somewhere in between 01:11:900-01:12:100) and "not synchronized" or "unsynchronized" may mean not aligned in time within ±100 ms (e.g., if the beat start time is 01:12:000, then the corresponding note start time is somewhere outside of 01:11:900-01:12:100). As a second example, in some implementations "synchronized" may mean aligned in time within ±50 ms (e.g., if the beat start time is 01:12:000, then the corresponding note start time is somewhere in between 01:11:950-01:12:050) and "not synchronized" or "unsynchronized" may mean not aligned in time within ±50 ms (e.g., if the beat start time is 01:12:000, then the corresponding note start time is somewhere outside of 01:11:950-01:12:050). As a third example, in some implementations "synchronized" may mean aligned in time within ±10 ms (e.g., if the beat start time is 01:12:000, then the corresponding note start time is somewhere in between 01:11:990-01:12:010) and "not synchronized" or "unsynchronized" may mean not aligned in time within ±10 ms (e.g., if the beat start time is 01:12:000, then the corresponding note start time is somewhere outside of 01:11:990-01:12:010).

In some implementations, for example when the first note has a length or duration that is at least as long as the time interval that separates adjacent beats in the first bar (e.g., the first note is a whole note, a half note, or a quarter note), the programmed "nuance" or "expressiveness" desired may be achieved when the start time of the first note is not synchronized (or "unsynchronized") with the respective start time of any of the beats in the first set of beats. In other implementations, for example when the first note has a length or duration that is shorter than the time interval that separates adjacent beats in the first bar (e.g., the first note is an eighth note, a sixteenth note, or a thirty-second note), the "unsynchronization" feature may be extended beyond the start times of beats to include specific points in the time intervals between adjacent beats. For example, if the first note has a length or duration characterized by $\frac{1}{2}^N$ of the time interval that separates adjacent beats in the first bar (where N is an integer and 1≤N≤5, such that: N=1 corresponds to an eighth note, N=2 corresponds to a sixteenth note, N=3 corresponds to a thirty-second note, N=4 corresponds to a sixty-fourth note, and N=5 corresponds to a one hundred twenty-eighth note), in some implementations the start time of the first note is advantageously not synchronized with any point in time corresponding to a $\frac{1}{2}^N$ fraction of the time interval between adjacent beats in the first set of beats. This feature is particularly relevant when there is deliberate misalignment between note start times and beat start times in a musical composition (i.e., even transcribed in the corresponding sheet music), such as for example, when a note is deliberately positioned in a time interval between adjacent beats. A specific example of such a scenario occurs when an eighth note is positioned in between two adjacent beats in a bar in 4/4 time. In accordance with the present systems, devices, and methods, the start time of an eighth note that is deliberately positioned in between adjacent beats may advantageously be deliberately not synchronized with the point in time corresponding to ½ of the time interval between the adjacent beats. This concept may be expanded to encompass any point in time corresponding to a $\frac{1}{2}^N$ fraction of the time interval between adjacent beats such that, for example, for a bar in 4/4 time:

- an eighth note may advantageously be not synchronized (or "unsynchronized") with: a) the respective start time of any of the beats in the bar; and b) any point in time corresponding to ½ of the time interval between adjacent beats in the bar
- a sixteenth note may advantageously be not synchronized (or "unsynchronized") with: a) the respective start time of any of the beats in the bar; b) any point in time corresponding to ½ of the time interval between adjacent beats in the bar; and c) any point in time corresponding to ¼ of the time interval between adjacent beats in the bar
- a thirty-second note may advantageously be not synchronized (or "unsynchronized") with: a) the respective start time of any of the beats in the bar; b) any point in time corresponding to ½ of the time interval between adjacent beats in the bar; c) any point in time corresponding to ¼ of the time interval between adjacent beats in the bar; and d) any point in time corresponding to ⅛ of the time interval between adjacent beats in the bar
- and so on It is theoretically possible to transcribe notes in sheet music for values of N above 5 (e.g., two hundred fifty-sixth notes for N=6, and so on) but values of N greater than 5 are quite rare and usually avoided.

Returning to method 600, at 602 the hierarchically-dependent data objects are encoded in a data file similar to act 202 from method 200, with the added detail that in the data file of method 600, the start time of the first note is not synchronized with the respective start time of any of the beats in the first set of beats.

At 603, the data file is stored in a non-transitory processor-readable storage medium similar to act 203 from method 200.

As described previously, the structure of the digital representations of music described herein gives rise to numerous advantages, particularly in the context of computer-based composition of music. Method 600 provides an example of how such structure enables deliberate timing features (e.g., a timing relationship in which a note start time is not synchronized with a beat start time) that can enhance the expressiveness and "humanness" of a computer-based composition. As an extension of this, FIG. 7 illustrates an exemplary method 700 in which the structure of the digital representations of music described herein enables the timing relationship between notes and beats in a musical composition (e.g., in at least a first bar of a musical composition) to be preserved in a computer-generated variation of the musical composition (e.g., in a computer-generated variation of the at least a first bar of the musical composition).

Figure 7:
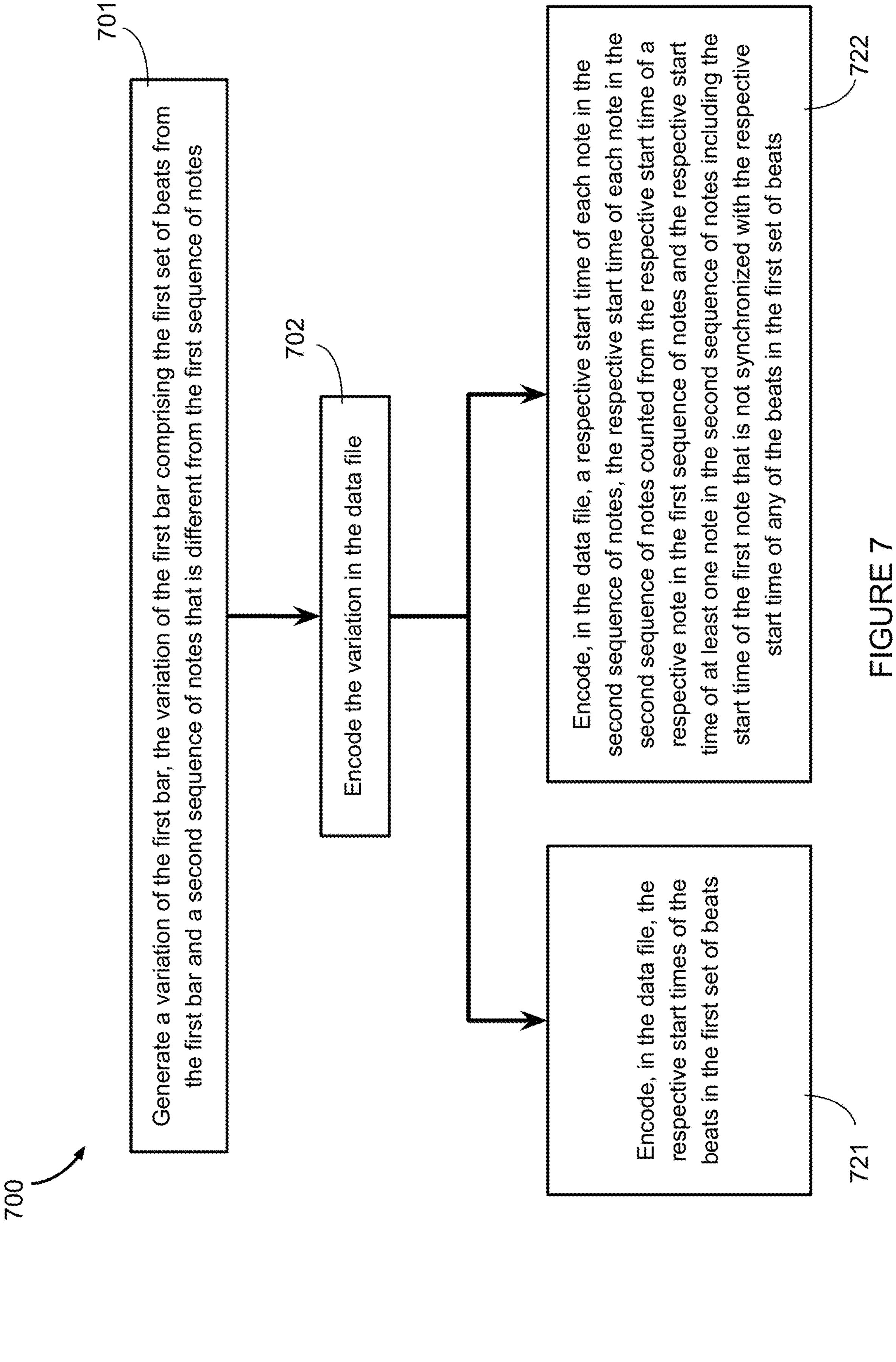
FIG. 7 is a flow diagram showing an exemplary computer-implemented method of generating and encoding a variation of a musical composition in a digital file format in accordance with the present systems, devices, and methods.

FIG. 7 is a flow diagram showing an exemplary computer-implemented method 700 of generating and encoding a variation of a musical composition in a digital file format in accordance with the present systems, devices, and methods. Method 700 may be implemented as an extension of method 600 and therefore may include all of the acts and sub-acts of method 600. For example, method 600 may optionally be extended to include method 700 when the first bar of the musical composition includes a first sequence of notes that includes the first note. In this case, encoding parameters of each note of the musical composition in a respective note data object at 611 of method 600 may include encoding, in a respective note data object, a respective pitch of each note in the first sequence of notes and a respective start time of each note in the first sequence of notes. Method 700 may be carried out on the first bar of the musical composition when a variation of the first bar is desired.

Method 700 includes two main acts 701 and 702. Main act 702 includes two sub-acts 721 and 722. Those of skill in the art will appreciate that in alternative implementations certain acts and/or sub-acts may be omitted and/or additional acts and/or sub-acts may be added. Those of skill in the art will also appreciate that the illustrated order of the acts and/or sub-acts is shown for exemplary purposes only and may change in alternative implementations.

At 701, a variation of the first bar is generated. The variation of the first bar comprises the same first set of beats from the original first bar but a new (i.e., a second) sequence of notes that is different from the original first sequence of notes. Thus, generating the variation of the first bar may include generating a second sequence of notes that is different from the first sequence of notes. The variation of the first bar may be generated by, for example, at least one processor, or by a combination of at least one processor and at least one non-transitory processor-readable storage medium with which the at least one processor is communicatively coupled. The at least one processor may generate the variation of the first bar in response to commands and instructions input by a user, or automatically by executing one or more music composition algorithms or programs stored in a non-transitory processor-readable storage medium communicatively coupled to the at least one processor. Generally, a second sequence of notes is considered different from a first sequence of notes if at least one note parameter (e.g., pitch, volume, start time, duration/length, or stop time) of at least one note in the second sequence of notes is different from a corresponding parameter of a corresponding note in the first sequence of notes.

At 702, the variation of the first bar is encoded in the data file. The variation of the first bar may be encoded in the data file by, for example, at least one processor, or by a combination of at least one processor and at least one non-transitory processor-readable storage medium with which the at least one processor is communicatively coupled. The data file may be stored in the non-transitory processor-readable storage medium.

Main act 702 includes two sub-acts 721 and 722. In method 700, the act of encoding the variation of the first bar in the data file involves performing sub-acts 721 and 722, each of which relates to encoding specific components and/or parameters of the variation in the data file.

At 721, the respective start times of the beats in the first set of beats are encoded in the data file (e.g., in a corresponding bar data object or in respective beat data objects). More explicitly, the same first set of beats with the same start times from the original instance of the first bar in the original musical composition are encoded in the data file at 721. The respective start times of the beats in the first set of beats may be encoded in the data file by, for example, at least one processor, or by a combination of at least one processor and at least one non-transitory processor-readable storage medium with which the at least one processor is communicatively coupled.

At 722, a respective start time of each note in the second sequence of notes is encoded in the data file (e.g., in respective note data objects). The respective start time of each note in the second sequence of notes may be encoded in the data file by, for example, at least one processor, or by a combination of at least one processor and at least one non-transitory processor-readable storage medium with which the at least one processor is communicatively coupled. Advantageously, the respective start time of each note in the second sequence of notes is matched to (e.g., synchronized with) or counted from the respective start time of a respective note in the first sequence of notes. This does not necessarily mean that the second sequence of notes has the same number of notes as the first sequence of notes, but only that the respective start time of each note in the second sequence of notes is determined by the respective start time of a respective note in the first sequence of notes. The term "counted from" in this context means that the start time of a second note is based on or derived from the start time of a first note, while the actual temporal alignment between the second note and the first note may depend on the other notes in the bar. For example, if an original bar in 4/4 time comprises four quarter notes each having a respective start time {t1, t2, t3, and t4} and a variation of the bar in 4/4 time also has four quarter notes, then each quarter note in the variation will have a respective start time that counts from (and is matched to) the respective start time of a respective quarter note in the original bar. That is, the respective start times of the quarter notes in the variation will also be {t1, t2, t3, and t4}. However, if the variation has a first eighth note, a second eighth note, a half note, and then a quarter note, then: the start time of the first eighth note vt1 may count from (and be matched to) the start time of the original first quarter note t1 (i.e., vt1=t1); the start time of the second eighth note vt2 may also count from the start time of the original first quarter note t1 and be offset therefrom by half of a beat (i.e., vt2=t1+(beat duration)/2)); the start time of the half note vt3 may count from (and be matched to) the start time of the original second quarter note t2 (i.e., vt3=t2); and the start time of the quarter note vt4 may count from (and be matched to) the start time of the original fourth quarter note t4 (i.e., vt4=t4).

In conventional musical theory, a variation such as the example described above would typically be thought of in terms of how note times map to beat times rather than how the variation note times map to the original note times. This is because in conventional musical theory, note times always match to (e.g., synchronize with) or count from beat times. However, as previously described (e.g., in the context of method 600 of FIG. 6), the digital representations of music described in the present systems, devices, and methods enable note start times and beat times to be encoded separately and independently of one another. This independence enables a computer-based algorithm or program to encode human-like expressiveness in a musical composition (per method 600) and even to preserve that human-like expressiveness in an auto-generated variation of the musical composition (per method 700). To this end, when a respective start time of each note in the second sequence of notes is encoded in the data file at 722 of method 700, the respective start time of at least one note in the second sequence of notes includes the start time of the first note (i.e., from method 600) that is not synchronized with the respective start time of any of the beats in the first set of beats.

In conventional sheet music, note start times are essentially "snapped to" or precisely aligned with beat times and the timing relationship therebetween is therefore predictable and fixed. In the present systems, devices, and methods, note start times and beat times are encoded separately into the data structure of the digital audio file and the timing relationship therebetween may be deliberately crafted, designed, characterized, preserved, and/or modified. The fact that a first note having a start time that is not synchronized with any beat time exists in both method 600 and method 700 means that both method 600 and method 700 involve a timing relationship between notes and beats that is not standard in sheet music. In an exemplary implementation of method 700, the timing relationship between the beats and notes in the original musical composition (e.g., in the first bar of the original composition) may be preserved in the beats and notes of the variation. That is: i) encoding, in the first bar data object, a respective start time of each beat in the first set of beats at 632; and ii) encoding, in a respective note data object, a respective start time of each note in the first sequence of notes (e.g., at 622), together provide a timing relationship between the notes and the beats in the first bar of the original musical composition, and encoding the variation of the first bar in the data file at 702 may include applying the timing relationship between the notes and the beats of the first bar of the original musical composition to the notes and the beats of the variation, or "preserving" the timing relationship between the notes and beats of the original musical composition in the notes and beats of the variation. This concept of "preserving" a timing relationship is demonstrated by illustrative example in FIGS. 8A and 8B.

Figure 8A:
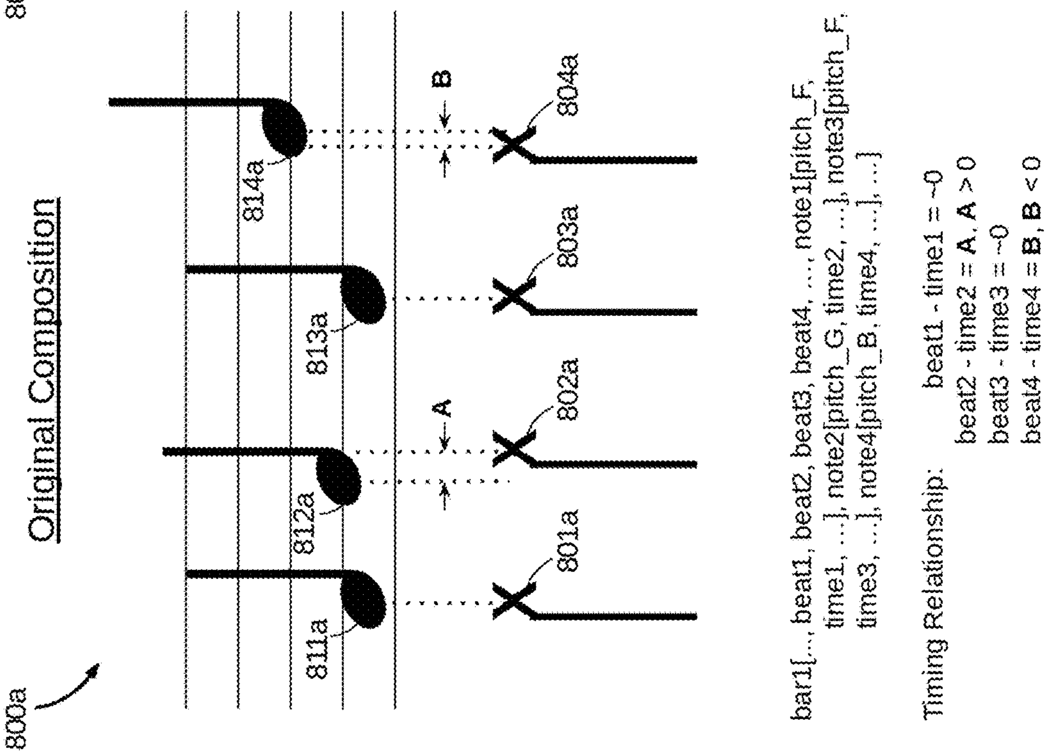
FIG. 8A is an illustrative diagram showing an exemplary first bar of an original musical composition and demonstrating an exemplary timing relationship between the notes and beats thereof in accordance with the present systems, devices, and methods.

FIG. 8A is an illustrative diagram showing an exemplary first bar 800*a* of an original musical composition and demonstrating an exemplary timing relationship between the notes and beats thereof in accordance with the present systems, devices, and methods. First bar 800*a* is in 4/4 time and includes a first set of four beats 801*a*, 802*a*, 803*a*, and 804*a* and a first sequence of four quarter notes 811*a*, 812*a*, 813*a*, and 814*a*. The bar1[ ] data object is given by:

bar1[ . . . , beat1, beat2, beat3, beat4, . . . , note1 [pitch_F, time1, . . . ], note2[pitch_G, time2, . . . ], note3[pitch_F, time3, . . . ], note4[pitch_B, time4, . . . ], . . . ]

In conventional sheet music, the timing of each quarter note 811*a*, 812*a*, 813*a*, and 814*a* would be precisely matched to (i.e., temporally aligned or synchronized with) the timing of a respective beat 801*a*, 802*a*, 803*a*, and 804. However, when first bar 800*a* is performed by a human musician, the human musician may (either intentionally or unintentionally) introduce discrepancies in the synchronization between certain notes and beats and these discrepancies may add a natural "human" feel to the performance. Examples of such timing discrepancies are illustrated in FIG. 8A. Specifically, the timing relationship between the notes and beats of first bar 800*a* is characterized as follows: first note 811*a* is substantially synchronized with first beat 801*a* (i.e., beat1−time1=~0); second note 812*a* is not synchronized with second beat 802*a* (or any other beat in first bar 800*a*) but rather offset in front of (i.e., played before) second beat 802*a* by an amount A (i.e., beat2−time2=A, A>0); third note 813*a* is substantially synchronized with third beat 803*a* (i.e., beat3~time3=~0); and fourth note 814*a* is not synchronized with fourth beat 804*a* (or any other beat in first bar 800*a*) but rather offset behind (i.e., played after) fourth beat 804*a* by an amount B (i.e., beat4−time4=B, B<0). In accordance with the present systems, devices, and methods, this timing relationship is a property of first bar 800*a* of the original musical composition that may advantageously be preserved in a variation of the musical composition.

Figure 8B:
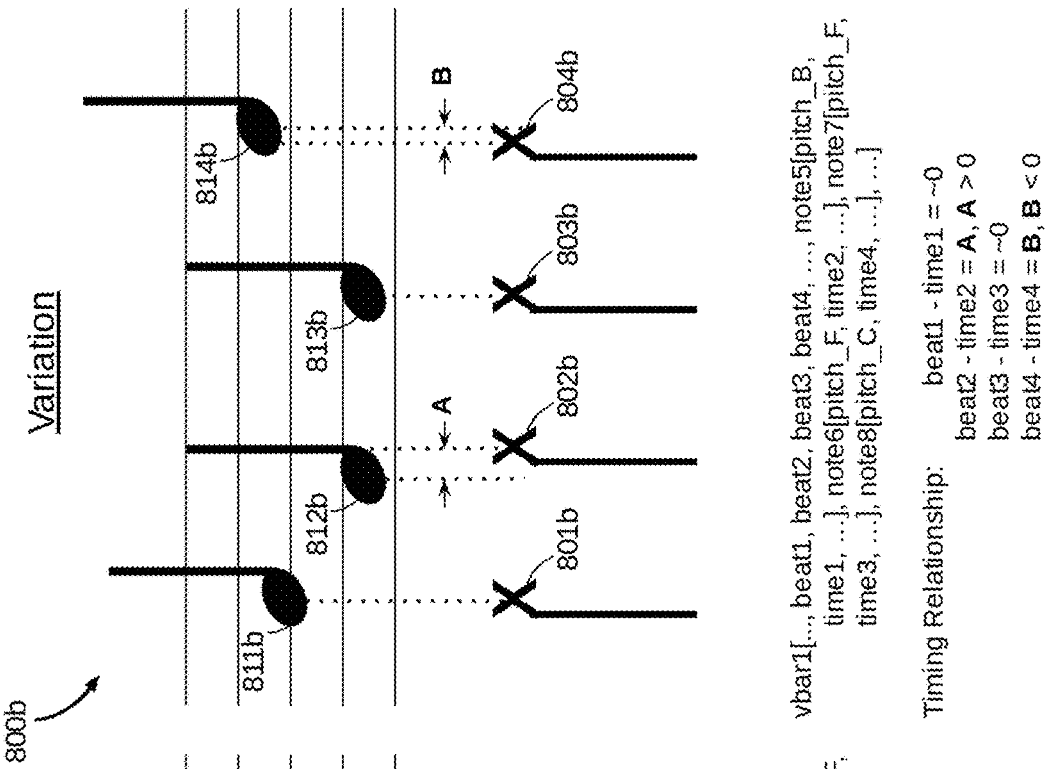
FIG. 8B is an illustrative diagram showing an exemplary variation of the first bar from FIG. 8A with the timing relationship of the first bar preserved in the variation in accordance with the present systems, devices, and methods.

FIG. 8B is an illustrative diagram showing an exemplary variation 800*b* of first bar 800*a* from FIG. 8A with the timing relationship of first bar 800*a* preserved in variation 800*b* in accordance with the present systems, devices, and methods. Variation 800*b* is in 4/4 time and includes a first set of four beats 801*b*, 802*b*, 803*b*, and 804*b* and a second sequence of four quarter notes 811*b*, 812*b*, 813*b*, and 814*b*. The first set of four beats 801*b*, 802*b*, 803*b*, and 804*b* of variation 800*b* is substantially similar to the first set of four beats 801*a*, 802*a*, 803*a*, and 804*a* of first bar 800*a* in the original musical composition; however, the second sequence of four quarter notes 811*b*, 812*b*, 813*b*, and 814*b* of variation 800*b* is different from the first sequence of four quarter notes 811*a*, 812*a*, 813*a*, and 814*a* of first bar 800*a* in the original musical composition. The vbar1[ ] data object is given by:

vbar1[ . . . , beat1, beat2, beat3, beat4, . . . , note5[pitch_B, time1, . . . ], note6[pitch_F, time2, . . . ], note7[pitch_F, time3, . . . ], note8[pitch_C, time4, . . . ], . . . ]

In accordance with the present systems, devices, and methods, the timing relationship between the notes and beats of first bar 800*a* of the original musical composition is preserved in variation 800*b*. This means that the timing relationship between the notes and beats of variation 800*b* is characterized in substantially the same way as the timing relationship between the notes and beats of first bar 800*a*; that is: first note 811*b* is substantially synchronized with first beat 801*b* (i.e., beat1−time1=~0); second note 812*b* is not synchronized with second beat 802*b* (or any other beat in variation 800*b*) but rather offset in front of (i.e., played before) second beat 802*b* by an amount A (i.e., beat2−time2=A, A>0); third note 813*b* is substantially synchronized with third beat 803*b* (i.e., beat3−time3=~0); and fourth note 814*b* is not synchronized with fourth beat 804*b* (or any other beat in first bar 800*b*) but rather offset behind (i.e., played after) fourth beat 804*b* by an amount B (i.e., beat4−time4=B, B<0). In this way, at least some of the nuance and expressiveness (i.e., some of the "humanness") of first bar 800*a* of the original musical composition may be automatically preserved or maintained in variation 800*b*.

FIGS. 8A and 8B show, for illustrative purposes, relatively simple examples of unsynchronizations between quarter notes 811*a*/811*b*, 812*a*/812*b*, 813*a*/813*b*, and 814*a*/814*b* and beats 801*a*/801*b*, 802*a*/802*b*, 803*a*/803*b*, and 804*a*/804*b*, respectively, in 4/4 time. This example is relatively simple because the quarter notes 811*a*/811*b*, 812*a*/812*b*, 813*a*/813*b*, and 814*a*/814*b* each have a respective length or duration that is about equal to the time interval that separates adjacent ones of beats 801*a*/801*b*, 802*a*/802*b*, 803*a*/803*b*, and 804*a*/804*b*, and therefore the unsynchronizations occur at the start times of beats 802*a*/802*b* and 804*a*/804*b*. However, as previously described, when a note has a length or duration that is shorter than the time interval that separates adjacent beats (e.g., for an eighth note, a sixteenth note, or a thirty-second note), the "unsynchronization" feature may be extended beyond the start times of beats to include specific points in the time intervals between adjacent beats. That is, if a note has a length or duration characterized by $\frac{1}{2}^N$ of the time interval that separates adjacent beats (where N is an integer and 1≤N), unsynchronization of such a note means that the start time of the note is not synchronized with any point in time corresponding to a $\frac{1}{2}^N$ fraction of the time interval between adjacent beats. An illustrative example of such unsynchronization is provided in FIG. 8C.

Figure 8C:
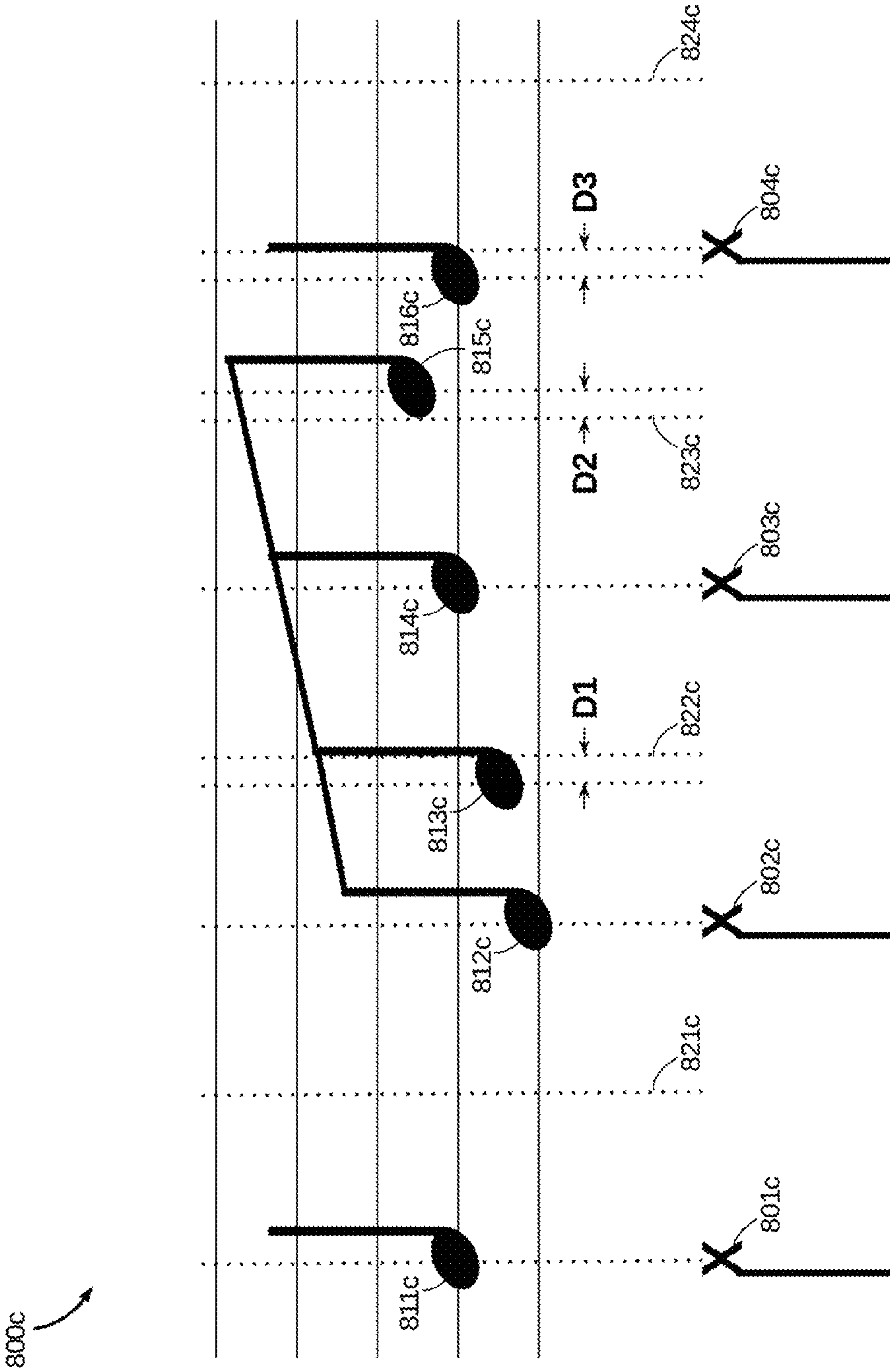
FIG. 8C is an illustrative diagram showing an exemplary bar of a musical composition and demonstrating exemplary "unsynchronizations" between notes and beats in accordance with the present systems, devices, and methods.

FIG. 8C is an illustrative diagram showing an exemplary bar 800*c* of a musical composition and demonstrating exemplary unsynchronizations between notes and beats in accordance with the present systems, devices, and methods. Bar 800*c* is in 4/4 time and includes a first set of four beats 801*c*, 802*c*, 803*c*, and 804*c* and a first sequence of notes comprising, in chronological order: quarter note 811*c*, eighth notes 812*c*, 813*c*, 814*c*, and 815*c*, and quarter note 816*c*. FIG. 8C also shows the "halfway points" 821*c*, 822*c*, 823*c*, and 824*c* between adjacent ones of beats 801*c*, 802*c*, 803*c*, and 804*c*, respectively. Halfway points 821*c*, 822*c*, 823*c*, and 824*c* correspond to respective points in time at ½" of the time intervals between adjacent ones of beats 801*c*, 802*c*, 803*c*, and 804*c* when N=1. N=1 is used because bar 800*c* includes eighth notes and, as previously described, for an eighth note to be "unsynchronized" it must not be synchronized with any beat start time and it must also not be synchronized with any point in time that is at ½ of the time interval between adjacent beats. Halfway point 824*c* represents the point in time that is at ½ of the time interval between beat 804*c* and the first beat of the next bar that immediately follows bar 800*c* (if indeed a next bar does follow bar 800*c*).

In exemplary bar 800*c*, quarter note 811*c* is synchronized with beat 801*c*, eighth note 812*c* is synchronized with beat 802*c*, eighth note 813*c* is not synchronized with (i.e., unsynchronized with) halfway point 822*c* by an amount D1, eighth note 814*c* is synchronized with beat 803*c*, eighth note 815*c* is not synchronized with (i.e., unsynchronized with) halfway point 823*c* by an amount D2, and quarter note 816*c* is not synchronized with (i.e., unsynchronized with) beat 804*c* by an amount D3. Eighth note 813*c* is played in front of (i.e., before) halfway point 822*c* by amount D1, eighth note 815*c* is played behind (i.e., after) halfway point 823*c* by amount D2, and quarter note 816*c* is played in front of (i.e., before) beat 804*c* by amount D3. Based on this illustrative example, a person of skill in the art will appreciate how the concept of unsynchronization may be extended to smaller and smaller time intervals separating adjacent beats for smaller and smaller note durations (i.e., for larger and larger values of N).

If a musical composition is transcribed in sheet music, when a machine "performs" the musical composition the precise timing relationship between notes and beats imposed by the sheet music may cause the performance to sound unnaturally perfect and robotic to the human ear. Conversely, when a human musician performs the musical composition slight discrepancies in the timing between notes and beats can imbue the performance with a sense of feeling that is pleasing to the human listener. In accordance with the present systems, devices, and methods, a performance of a musical composition by a human musician may be analyzed (e.g., recorded and then analyzed) to extract the actual realized timing relationship between the notes and the beats (i.e., the timing relationship actually played by the musician, not necessarily the precise timing relationship represented in the corresponding sheet music), and then this same timing relationship may be preserved in any number of variations of the musical composition that are automatically generated by a computer algorithm or program.

Returning to FIG. 7, as previously described method 700 may optionally be implemented as an extension of method 600. Method 600 results in an encoded data file stored in a non-transitory processor-readable storage medium, and in method 700 either a new data file may be encoded and stored or the same data file from method 600 may be manipulated and overwritten. That is, in some implementations, at 702 encoding the variation of the first bar data object in the data file may include replacing, in the data file, the first bar data object (i.e., from method 600) with the variation of the first bar data object. In this case, sub-acts 721 and 722 of method 700 may encode within the same data file and the same first bar data object as method 600, meaning: a) encoding, in the data file, the respective start times of the beats in the first set of beats at 721 includes encoding, in the first bar data object from method 600, the respective start times of the beats in the first set of beats; and b) encoding, in the data file, a respective pitch of each note in the second sequence of notes and a respective start time of each note in the second sequence of notes at 722 includes encoding, in the first bar data object from method 600, the respective pitch of each note in the second sequence of notes and the respective start time of each note in the second sequence of notes.

The various implementations described herein provide systems, devices, and methods that represent a musical composition in a digital audio file format by encoding respective components of the musical composition in respective data objects and encoding all of the data objects in at least one data file. In some of the implementations described above, many of the data objects are inter-related in a hierarchically-dependent data structure and the examples provided herein illustrate certain benefits that may be exploited in such a structure (e.g., the "unsynchronization" of notes and beats and the preservation of timing relationships across musical variations). However, while such benefits have so far been demonstrated in a hierarchically-dependent data structure, it is possible to take advantage of some benefits of the present systems, devices, and methods without requiring a hierarchically-dependent data structure.

Figure 9:
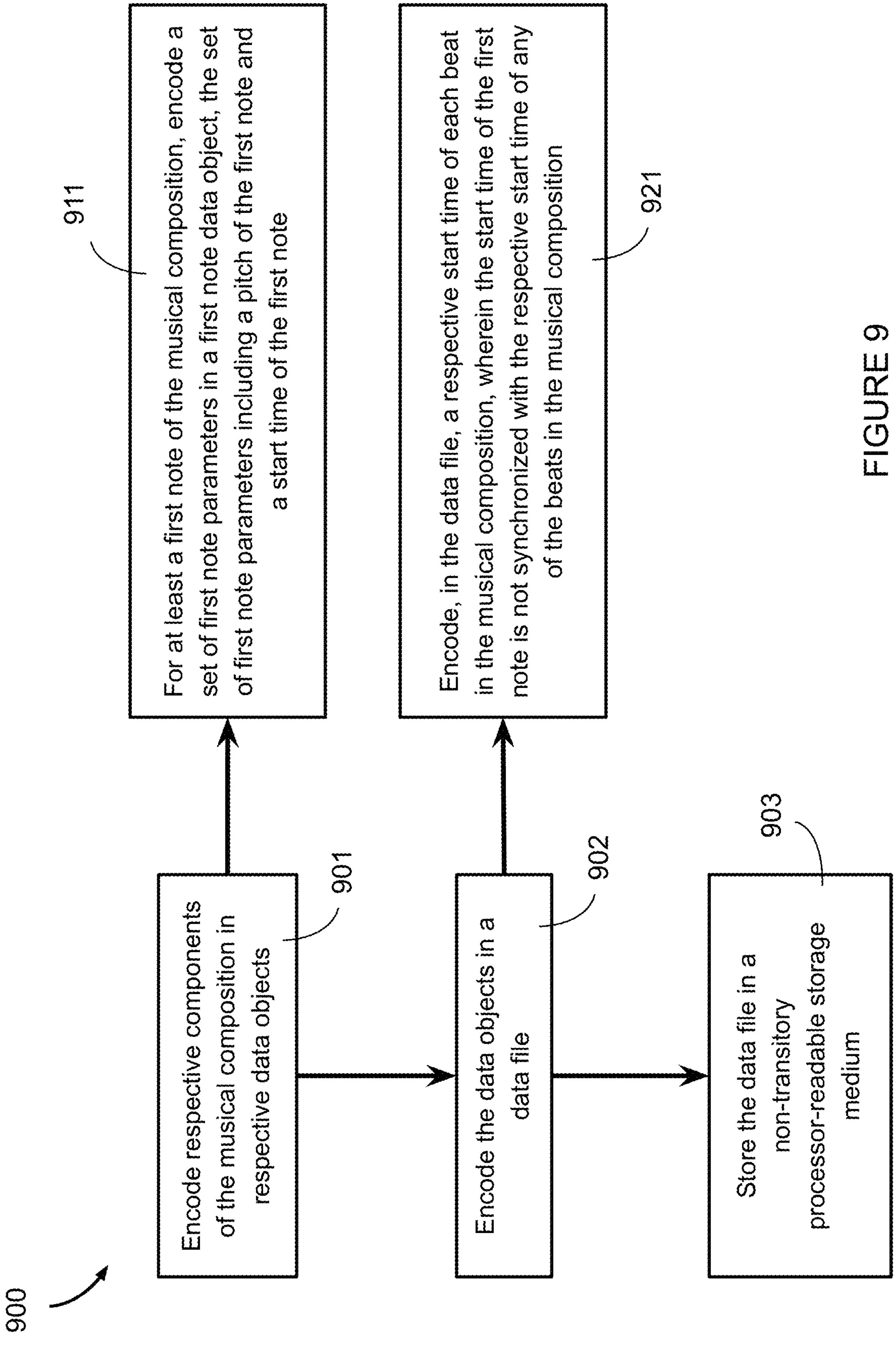
FIG. 9 is a flow diagram showing another exemplary computer-implemented method of encoding a musical composition in a digital file format in accordance with the present systems, devices, and methods.

FIG. 9 is a flow diagram showing an exemplary computer-implemented method 900 of encoding a musical composition in a digital file format in accordance with the present systems, devices, and methods. Method 900 includes three main acts 901, 902, and 903 and two sub-acts 911 and 921. Main act 901 includes sub-act 911 and main act 902 includes sub-act 921. Those of skill in the art will appreciate that in alternative implementations certain acts and/or sub-acts may be omitted and/or additional acts and/or sub-acts may be added. Those of skill in the art will also appreciate that the illustrated order of the acts and/or sub-acts is shown for exemplary purposes only and may change in alternative implementations.

Generally, acts 901, 902, and 903 of method 900 are substantially similar to acts 101, 102, and 103, respectively, of method 100 from FIG. 1, except that method 900 includes additional specificity for the purposes of illustrating an exemplary implementation of the present systems, devices, and methods.

For example, at 901 respective components of the musical composition are encoded (e.g., by at least one processor) in respective data objects in a manner similar to act 101 of method 100; however, act 901 includes sub-act 911 that provides further specificity for the encoding of at least one component of the musical composition. At 911, at least a set of first note parameters for at least a first note of the musical composition are encoded (e.g., by at least one processor) in a first note data object. The set of first note parameters may include many different parameters depending on the particular implementation, but for the purposes of method 900 the set of first note parameters includes at least a pitch of the first note and a start time of the first note.

At 902, the data objects are encoded (e.g., by at least one processor) in a data file in a manner similar to act 102 of method 100; however, act 902 includes sub-act 921 that provides further specificity for the encoding of the data objects in the data file. At 921, a respective start time of each beat in the musical composition is encoded in the data file (e.g., in a first bar data object that includes the first note data object). In a similar way to that described for method 600, though without necessarily requiring the hierarchical dependency of the data objects, in method 900 the start time of the first note encoded at 911 is not synchronized with the respective start time of any of the beats encoded at 921. In this way, method 900 achieves the benefit of "unsynchronization" between notes and beats by separating note and beat timing parameters into different data objects without necessarily implementing a hierarchically-dependent data structure.

At 903, the data file is stored (e.g., by at least one processor, or by a non-transitory processor-readable storage medium) in a non-transitory processor-readable storage medium in a similar way to act 103 of method 100.

Figure 10:
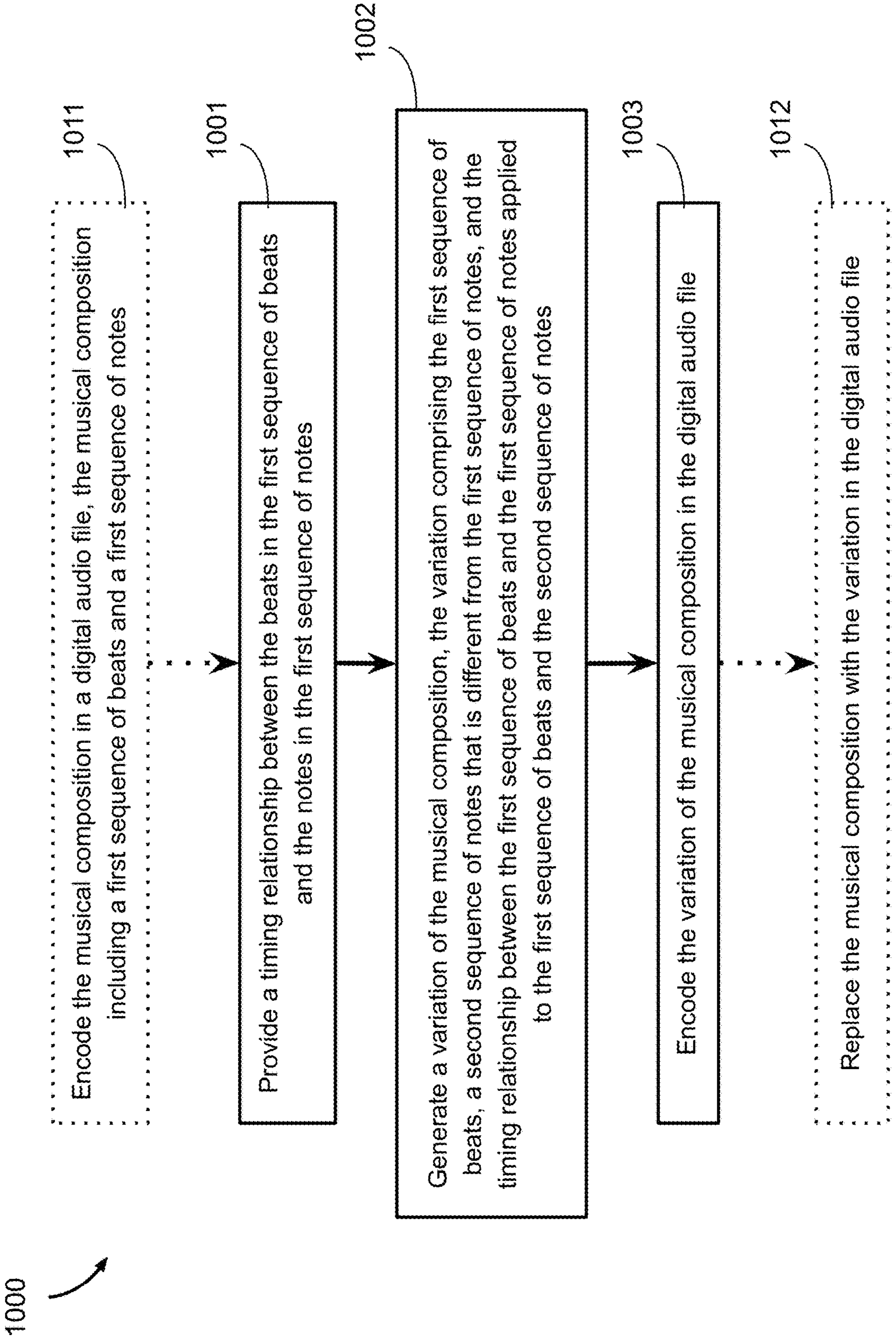
FIG. 10 is a flow diagram showing another exemplary computer-implemented method of encoding a variation of a musical composition in a digital file format in accordance with the present systems, devices, and methods.

Method 900 provides an illustrative example of an implementation of the present systems, devices, and methods in which the benefit of "unsynchronization" between notes and beats is achieved without a hierarchically-dependent data structure. Even though method 900 does not necessarily require a hierarchically-dependent data structure, method 900 still involves encoding respective components of a musical composition in respective data objects (i.e., at act 901). FIG. 10 shows an exemplary implementation of the present systems, devices, and methods in which the previously-described benefits of "unsynchronization" and "timing relationship preservation" are both achieved even without necessarily encoding respective components of the musical composition in respective data objects.

FIG. 10 is a flow diagram showing an exemplary computer-implemented method 1000 of encoding a variation of a musical composition in a digital file format in accordance with the present systems, devices, and methods. For the purposes of method 1000, the original musical composition (i.e., the musical composition of which a variation is encoded in method 1000) comprises a first sequence of beats and a first sequence of notes. Method 1000 includes three acts 1001, 1002, and 1003 and two optional acts 1011 and

1012. Optional act 1011 optionally precedes act 1001 and optional act 1012 optionally follows act 1003. Those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1001, a timing relationship between the beats in the first sequence of beats and the notes in the first sequence of notes is provided. In some implementations, this timing relationship may already be encoded in a data file (e.g., a digital audio file, such as but not limited to a .hum file) representing the original musical composition and "providing" the timing relationship at 1001 may simply involve reading or extracting the timing relationship from the digital audio file (e.g., by at least one processor). When providing the timing relationship at 1001 may be achieved by reading or extracting the timing relationship from a digital audio file, optional act 1011 may not be needed. However, in other implementations, a digital audio file encoding the original musical composition may not be available, in which case method 1000 may include optional act 1011 before act 1001.

At optional act 1011, the original musical composition (i.e., the musical composition of which a variation is encoded in method 1000) is encoded in a digital audio file. The original musical composition includes the first sequence of beats and the first sequence of notes, and therefore act 1011 includes encoding the timing relationship between the beats in the first sequence of beats and the notes in the first sequence of notes in the digital audio file. In summation, act 1001 generally requires that the timing relationship between the beats in the first sequence of beats in the original musical composition and the notes in the first sequence of notes in the original musical composition be available. If such timing relationship is already available in an existing encoding of the original musical composition, then method 1000 may skip optional act 1011 and begin at 1001. If such timing relationship is not already available in an existing encoding of the original musical composition, then method 1000 may begin at act 1011 where the timing relationship of the original musical composition is encoded.

As previously described, in accordance with the present systems, devices, and methods, the original musical composition may advantageously employ a timing relationship (i.e., the timing relationship that may be, optionally, encoded in a digital audio file at 1011 and read or extracted at 1001) between the beats in the first sequence of beats and the notes in the first sequence of notes in which a start time of at least one note in the first sequence of notes is not synchronized with a start time of any beat in the first sequence of beats.

At 1002, a variation of the musical composition is generated (e.g., by at least one processor, or by a combination of at least one processor and a non-transitory processor-readable storage medium with the at least one processor is communicatively coupled). Even though in method 1000 the respective components of the original musical composition and/or the variation are not necessarily encoded in respective data objects, a result of act 1002 may be substantially similar to the result of act 701 of method 700. The variation generated at 1002 may include the same first sequence of beats from the original musical composition and a new (i.e., a second) sequence of notes that is different from the original first sequence of notes. Furthermore, in accordance with the present systems, devices, and methods, the variation generated at 1002 may include (i.e., preserve or maintain) the timing relationship between the original first sequence of beats and the original first sequence of notes in the original musical composition applied to the first sequence of beats and the new second sequence of notes in the variation. Generally, generating a variation of the musical composition at 1002 may include the sub-acts of: i) generating the second sequence of notes that is different from the first sequence of notes; and ii) applying the timing relationship between the first sequence of beats and the first sequence of notes to the first sequence of beats and the second sequence of notes.

At 1003, the variation of the musical composition is encoded in a digital audio file. If method 1000 is performed without access to a digital audio file corresponding to the original musical composition (e.g., if optional act 1011 is not performed and the necessary timing relationship is provided by other means), or if the digital audio file corresponding to the original musical composition is to be kept, then the digital audio file encoded at 1003 may be separate from a digital audio file encoding of the original musical composition and method 1000 may terminate with act 1003. If method 1000 is performed with an intent to replace the original musical composition with the variation, then method 1000 may proceed from act 1003 to optional act 1012.

At optional act 1012, the encoding of the original musical composition is replaced (e.g., by at least one processor or by a combination of at least one processor and a non-transitory processor-readable storage medium with which the at least one processor is communicatively coupled) by the encoding of the variation in the digital audio file.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, an exemplary computer system suitable for implementing the present systems, devices, and methods is provided in FIG. 11.

FIG. 11 is an illustrative diagram of a processor-based computer system 1100 suitable at a high level for encoding a musical composition in a digital audio format in accordance with the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Processor-based computer system 1100 includes at least one processor 1101, a non-transitory processor-readable storage medium or "system memory" 1102, and a system bus 1110 that communicatively couples various system components including the system memory 1102 to the processor(s) 1101. Processor-based computer system 1101 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 1101 of processor-based computer system 1100 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 11 may be presumed to be of conventional design. As a result, such blocks need not be described in further detail herein as they will be understood by those skilled in the relevant art.

The system bus 1110 in the processor-based computer system 1100 may employ any known bus structures or architectures, including a memory bus with memory controller, a peripheral bus, and/or a local bus. The system memory 1102 includes read-only memory ("ROM") 1121 and random access memory ("RAM") 1122. A basic input/output system ("BIOS") 1123, which may or may not form part of the ROM 1121, may contain basic routines that help transfer information between elements within processor-based computer system 1100, such as during start-up. Some implementations may employ separate buses for data, instructions and power.

Processor-based computer system 1100 (e.g., system memory 1102 thereof) may include one or more solid state memories, for instance, a Flash memory or solid state drive (SSD), which provides nonvolatile storage of processor-executable instructions, data structures, program modules and other data for processor-based computer system 1100. Although not illustrated in FIG. 11, processor-based computer system 1100 may, in alternative implementations, employ other non-transitory computer- or processor-readable storage media, for example, a hard disk drive, an optical disk drive, or a memory card media drive.

Program modules in processor-based computer system 1100 may be stored in system memory 1102, such as an operating system 1124, one or more application programs 1125, program data 1126, other programs or modules 1127, and drivers 1128.

The system memory 1102 in processor-based computer system 1100 may also include one or more communications program(s) 1129, for example, a server and/or a Web client or browser for permitting processor-based computer system 1100 to access and exchange data with other systems such as user computing systems, Web sites on the Internet, corporate intranets, or other networks as described below. The communications program(s) 1129 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 11 as being stored locally in system memory 1102, operating system 1124, application programs 1125, program data 1126, other programs/modules 1127, drivers 1128, and communication program(s) 1129 may be stored and accessed remotely through a communication network or stored on any other of a large variety of non-transitory processor-readable media (e.g., hard disk drive, optical disk drive, SSD and/or flash memory).

Processor-based computer system 1100 may include one or more interface(s) to enable and provide interactions with a user, peripheral device(s), and/or one or more additional processor-based computer system(s). As an example, processor-based computer system 1110 includes interface 1130 to enable and provide interactions with a user of processor-based computer system 1100. A user of processor-based computer system 1100 may enter commands, instructions, data, and/or information via, for example, input devices such as computer mouse 1131 and keyboard 1132. Other input devices may include a microphone, joystick, touch screen, game pad, tablet, scanner, biometric scanning device, wearable input device, and the like. These and other input devices (i.e., "I/O devices") are communicatively coupled to processor(s) 1101 through interface 1130, which may include one or more universal serial bus ("USB") interface(s) that communicatively couples user input to the system bus 1110, although other interfaces such as a parallel port, a game port or a wireless interface or a serial port may be used. A user of processor-based computer system 1100 may also receive information output by processor-based computer system 1100 through interface 1130, such as visual information displayed by a display 1133 and/or audio information output by one or more speaker(s) 1134. Monitor 1133 may, in some implementations, include a touch screen.

As another example of an interface, processor-based computer system 1100 includes network interface 1140 to enable processor-based computer system 1100 to operate in a networked environment using one or more of the logical connections to communicate with one or more remote computers, servers and/or devices (collectively, the "Cloud" 1141) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 1140 may include one or more wired or wireless communications interfaces, such as network interface controllers, cellular radios, WI-FI radios, and/or Bluetooth radios for establishing communications with the Cloud 1141, for instance, the Internet or a cellular network.

In a networked environment, program modules, application programs or data, or portions thereof, can be stored in a server computing system (not shown). Those skilled in the relevant art will recognize that the network connections shown in FIG. 11 are only some examples of ways of establishing communications between computers, and other connections may be used, including wirelessly.

For convenience, processor(s) 1101, system memory 1102, interface 1130, and network interface 1140 are illustrated as communicatively coupled to each other via the system bus 1110, thereby providing connectivity between the above-described components. In alternative implementations, the above-described components may be communicatively coupled in a different manner than illustrated in FIG. 11. For example, one or more of the above-described components may be directly coupled to other components, or may be coupled to each other via intermediary components (not shown). In some implementations, system bus 1110 may be omitted with the components all coupled directly to each other using suitable connections.

In accordance with the present systems, devices, and methods, processor-based computer system 1100 may be used to implement any or all of methods 100, 200, 600, 700, 900, and/or 1000 described herein and/or encode and manipulate any or all of the data structures described herein, including without limitation data structures 300, 400, and 500. Where the descriptions of methods 100, 200, 600, 700, 900, and 1000 make reference to an act being performed by at least one processor, such act may be performed by processor(s) 1101 of computer system 1100. Where the descriptions of methods 100, 200, 600, 700, 900, and 1000 make reference an act being performed by, performed on, or otherwise involving a non-transitory processor-readable storage medium, such act may be performed by, performed on, or otherwise involve system memory 1102 of computer system 1100. Similarly, data structures 300, 400, and 500 represent illustrative examples of data structures that may be encoded by processor(s) 1101 and stored in system memory 1102 in the present systems, devices, and methods.

Computer system 1100 is an illustrative example of a system for encoding a musical composition in a digital audio format, the system comprising at least one processor 1101, at least one non-transitory processor-readable storage medium 1102 communicatively coupled to the at least one processor 1101 (e.g., by system bus 1110), and the various other hardware and software components illustrated in FIG. 11 (e.g., operating system 1124, mouse 1131, etc.). In particular, in order to enable system 1100 to implement the present systems, devices, and methods, system memory 1102 stores a computer program product 1150 comprising processor-executable instructions and/or data that, when executed by processor(s) 1101, cause processor(s) 1101 to perform the various processor-based acts of methods 100, 200, 600, 700, 900, and/or 1000 as described herein. Using method 100 as an example, the processor-executable instructions and/or data of computer program product 1150 stored in system memory 1102 may, when executed by processor(s) 1101, cause processor(s) 1101 to encode respective components of a first instance of the musical composition in respective data objects per act 101 of method 100, encode the data objects in a data file 1151 per act 102 of method 100, and store data file 1151 in system memory 1102 per act 103 of method 100. As illustrated in FIG. 11, data file 1151 may be a "hierarchical universal music" digital file format having a .hum file extension.

Throughout this specification and the appended claims, the term "computer program product" is used to refer to a package, combination, or collection of software comprising processor-executable instructions and/or data that may be accessed by (e.g., through a network such as cloud 1141) or distributed to and installed on (e.g., stored in a local non-transitory processor-readable storage medium such as system memory 1102) a computer system (e.g., computer system 1100) in order to enable certain functionality (e.g., application(s), program(s), and/or module(s)) to be executed, performed, or carried out by the computer system.

Turning again to FIG. 11, the .hum file 1151 that is encoded and/or manipulated when processor(s) 1101 of system 1100 execute(s) the processor-executable instructions and/or data of computer program product 1150 stored in system memory 1102 may, in accordance with the present systems, devices, and methods, encode data objects having a hierarchically-dependent structure such as data structures 300, 400, and/or 500. If a first instance of the musical composition encoded in .hum file 1151 includes a first sequence of notes and a first set of bars, then .hum file 1151 may include a respective note data object that encodes each note of the first instance of the musical composition and a respective bar data object that encodes each bar of the first instance of the musical composition. Each respective note data object encoded in .hum file 1151 may, in some implementations, encode a respective start time of each note. If the first instance of the musical composition encoded in .hum file 1151 also includes a first set of beats, then .hum file 1151 may encode a respective beat start time of each beat in the first set of beats. In some implementations, .hum file 1151 may encode one or more "unsynchronizations" between note times and beat times as described herein, for example, in relation to methods 600, 700, 900, and 1000. More specifically, .hum file 1151 may encode beat start times and note start times that are independent of one another to provide a timing relationship between the beats and the notes of the first instance of the musical composition in which at least one note start time is not synchronized with any beat start time.

Computer program product 1150, and therefore computer system 1100 when computer program product 1150 is either accessed through network 1140 or stored in system memory 1102, may also be configured to generate one or more musical variations of the first instance of the musical composition in accordance with the present systems, devices, and methods. For example, computer program product 1150 may include processor-executable instructions and/or data that, when executed by processor(s) 1101, cause processor(s) 1101 to generate a variation of the first instance of the musical composition (e.g., per act 701 of method 700 and/or act 1002 of method 1000). The variation of the first instance of the musical composition may be encoded in .hum file 1151 and stored in system memory 1102, and may or may not replace the first instance of the musical composition in .hum file 1151 depending on the specific implementation. Generally, the variation may include a second sequence of notes that is different from the first sequence of notes such that .hum file 1151 encodes a second set of note data objects (corresponding to the second sequence of notes) that is different from the first set of note data objects (corresponding to the first sequence of notes); however, in accordance with the present systems, devices, and methods, the variation encoded in .hum file 1151 may preserve the timing relationship between the beats and the notes of the first instance of the musical composition in the beats and the notes of the variation.

The various implementations described herein improve the functioning of computer systems for the specific practical application of algorithmic composition of music. Encoding various components of a musical composition in separate discrete data objects introduces a modularity that enables exceptional (relative to other approaches in the art) algorithmic control to set, vary, manipulate, and rearrange the various components of the composition. This modularity may be taken advantage of in algorithmic composition to produce new and improved software and applications for computer-based music creation/variation that output more sophisticated and enjoyable musical results. But modularity is just one example of how the present systems, devices, and methods improve the functioning of computer systems for automatic music generation. There are many other ways in which the present systems, devices, and methods advantageously improve the use of computers for generating music, including without limitation: enabling various component parameters (e.g., note timing and beat timing) to be defined and manipulated independently of one another; enabling certain parametric relationships (e.g., timing relationships) to be preserved across different components and/or parameters while other parametric relationships (e.g., note sequences) are varied; and enabling musical compositions to be defined and manipulated using the higher-level concepts of musical theory with which most composers and musicians are already familiar. These and other advantages are all achieved within a data file (e.g., the .hum file) that is well-suited for communication between computer systems and electronic instruments.

Throughout this specification and the appended claims, reference is often made to musical compositions being "automatically" generated/composed by computer-based algorithms, software, and/or artificial intelligence (AI) techniques. A person of skill in the art will appreciate that a wide range of algorithms and techniques may be employed in computer-generated music, including without limitation: algorithms based on mathematical models (e.g., stochastic processes), algorithms that characterize music as a language with a distinct grammar set and construct compositions within the corresponding grammar rules, algorithms that employ translational models to map a collection of non-musical data into a musical composition, evolutionary methods of musical composition based on genetic algorithms, and/or machine learning-based (or AI-based) algorithms that analyze prior compositions to extract patterns and rules and then apply those patterns and rules in new compositions. These and other algorithms may be advantageously adapted to exploit the features and techniques enabled by the digital representations of music described herein.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of encoding a musical composition in a digital audio format, wherein the musical composition includes a first bar and the first bar includes a first chord the method comprising:

encoding respective components of the musical composition in respective data objects, wherein encoding respective components of the musical composition in respective data objects includes:

encoding the first bar in a first bar data object and encoding the first chord in a first chord data object, where the first bar data object includes the first chord data object and wherein the first chord data object encodes a first chord key and a first chord scale;

encoding the data objects in a data file;

generating a variation of the first bar, wherein generating a variation of the first bar includes adding a second chord data object in the first bar data object, wherein the second chord data object encodes a second chord having a second chord key and a second chord scale, the second chord different from the first chord;

encoding the variation of the first bar in the data file; and storing the data file in a non-transitory processor-readable storage medium.

2. The method of claim 1 wherein encoding respective components of the musical composition in respective data objects includes encoding respective components of the musical composition in a set of hierarchically-dependent data objects.

3. The method of claim 2 wherein encoding respective components of the musical composition in a set of hierarchically-dependent data objects includes encoding parameters of each bar of the musical composition in a respective bar data object, and wherein for each bar of the musical composition that includes at least one chord, a corresponding bar data object includes at least one chord data object.

4. The method of claim 2 wherein encoding respective components of the musical composition in a set of hierarchically-dependent data objects includes encoding parameters of each bar of the musical composition in a respective bar data object, wherein each bar in at least a first set of bars of the musical composition includes at least one respective chord, and wherein encoding parameters of each bar of the musical composition in a respective bar data object includes, for each bar in the first set of bars of the musical composition, encoding at least one respective chord data object in a corresponding bar data object.

5. The method of claim 1 wherein the first bar data object encodes a first bar key and wherein the first chord key is a same key as the first bar key.

6. The method of claim 1 wherein the first bar data object encodes a first bar scale and wherein the first chord scale is a same scale as the first bar scale.

7. The method of claim 1 wherein adding a second chord data object in the first bar data object includes replacing the first chord data object with the second chord data object in the first bar data object.

8. The method of claim 1 wherein the second chord key is a same chord key as the first chord key.

9. The method of claim 1 wherein the second chord scale is a same chord scale as the first chord scale.

10. The method of claim 1 wherein the first bar data object encodes a first bar key and the second chord key is a same key as the first bar key.

11. The method of claim 1 wherein the first bar data object encodes a first bar scale and the second chord scale is a same scale as the first bar scale.

* * * * *